United States Patent [19]

Kiyohara et al.

[11] Patent Number: 5,237,693

[45] Date of Patent: Aug. 17, 1993

[54] SYSTEM FOR ACCESSING PERIPHERAL DEVICES CONNECTED IN NETWORK

[75] Inventors: Toshimi Kiyohara, Nara; Tomohisa Yamaguchi, Ikoma, both of Japan

[73] Assignee: Sharp Kabushiki Kaisha, Osaka, Japan

[21] Appl. No.: 676,981

[22] Filed: Mar. 29, 1991

[30] Foreign Application Priority Data

| Apr. 4, 1990 | [JP] | Japan | 2-89665 |
| Apr. 4, 1990 | [JP] | Japan | 2-89666 |
| Apr. 5, 1990 | [JP] | Japan | 2-91042 |
| Apr. 12, 1990 | [JP] | Japan | 2-97225 |

[51] Int. Cl.$^5$ .......................................... G06F 13/00
[52] U.S. Cl. ............................ 395/725; 364/238.3; 364/240; 364/241.9; 364/DIG. 1; 395/200; 395/325
[58] Field of Search ............. 370/85, 60.1, 90.1; 340/825; 364/200; 395/200, 250, 275, 725, 325

[56] References Cited

U.S. PATENT DOCUMENTS

| 4,326,289 | 4/1982 | Dickinson | 370/85 |
| 4,423,414 | 12/1983 | Bryant et al. | 340/825.07 |
| 4,454,575 | 6/1984 | Bushaw et al. | 364/200 |
| 4,658,351 | 4/1987 | Teng | 364/200 |
| 4,663,748 | 5/1987 | Karbowiak et al. | 370/89 |
| 4,680,581 | 7/1987 | Kozlik et al. | 340/825.06 |
| 4,777,595 | 10/1988 | Strecker et al. | 364/200 |
| 4,831,518 | 5/1989 | Yu et al. | 364/200 |
| 4,835,674 | 5/1989 | Collins et al. | 364/200 |
| 4,885,742 | 12/1989 | Yano | 370/85.2 |
| 4,897,781 | 1/1990 | Chang et al. | 364/200 |
| 4,907,224 | 3/1990 | Scoles et al. | 370/85.2 |
| 4,941,089 | 7/1990 | Fisher | 364/200 |
| 4,962,497 | 10/1990 | Ferenc et al. | 370/60.1 |
| 4,991,133 | 2/1991 | Devis et al. | 364/200 |
| 5,008,879 | 4/1991 | Fisher et al. | 370/85.2 |
| 5,060,263 | 10/1991 | Bosen et al. | 364/200 |
| 5,081,623 | 1/1992 | Ainscow | 370/85.4 |
| 5,095,480 | 3/1992 | Fenner | 370/94.1 |
| 5,121,390 | 6/1992 | Farrell et al. | 395/200 |
| 5,126,932 | 6/1992 | Wolfson et al. | 364/200 |
| 5,146,568 | 9/1992 | Flaherty et al. | 395/325 |

FOREIGN PATENT DOCUMENTS

| 61-70654 | 4/1986 | Japan . |
| 1-144154 | 6/1989 | Japan . |
| 2-109136 | 4/1990 | Japan . |
| 2-52900 | 11/1990 | Japan . |

Primary Examiner—Michael R. Fleming
Assistant Examiner—Tariq Rafiq Hafiz
Attorney, Agent, or Firm—Nixon & Vanderhye

[57] ABSTRACT

The system for accessing a plurality of devices connected in a network by using a system call, said system capable of accessing a device connected with any one of nodes through the network, the system includes a unit for detecting a device requested to be accessed and a node connected with the device through the network, a unit for converting the system call into a protocol at a time when the device to be accessed is connected with a different node from which the access is not issued, a unit for transmitting the protocol from the node to the different node through the network, and a unit for reconverting the protocol transmitted into the system call so that the system call is executed. The converting unit is adapted to execute the system call at a time when the device to be accessed is connected with a node from which the access is issued and the detecting unit includes an application for issuing the system call for accessing the device connected with the different node, and a router for detecting whether or not the device to be accessed is located in the node.

19 Claims, 26 Drawing Sheets

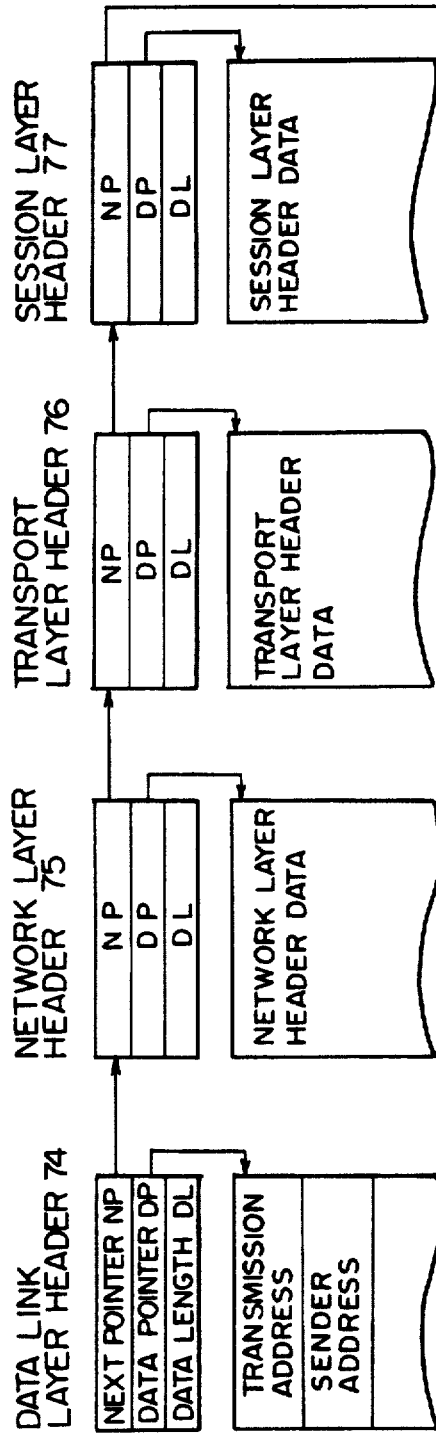
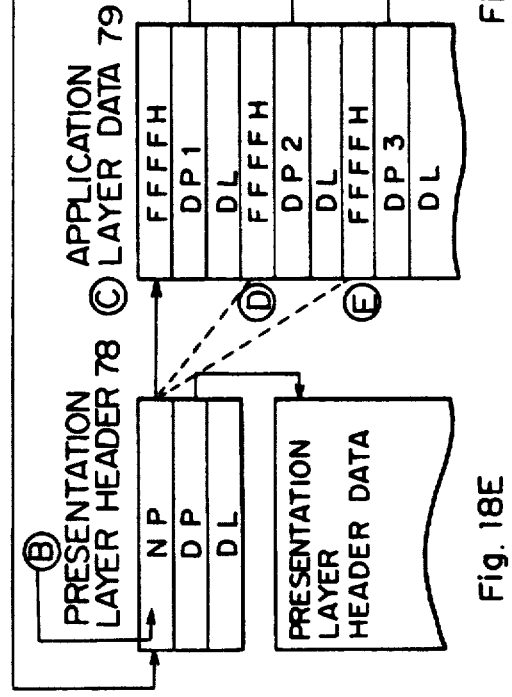
Fig. 18

SYSTEM FOR ACCESSING PERIPHERAL DEVICES CONNECTED IN NETWORK

BACKGROUND OF THE INVENTION

1. Field of the Invention

The present invention relates to a system for accessing peripheral devices connected in a network, and in particular, a system capable of sharing devices located at nodes included in the network and capable of accessing the devices in a distributed manner. More particularly, the present invention relates to a system capable of providing a high-speed communication buffering control function and a high-speed communication bus window control function for accessing peripheral devices connected in a network.

2. Description of the Related Arts

The inventors of the present invention know that the system for accessing peripheral devices connected in a network designed to build driver software in an operating system and to load within the driver software a virtual peripheral device system having the different configuration rather than the actual peripheral device configuration for managing accesses of the actual peripheral devices.

The inventors of the present invention know that another system for accessing peripheral devices connected in a network designed to build the virtual peripheral device system configured from two or more managing areas for managing accesses of the actual peripheral devices.

In the following parts, an operation of one of the above-mentioned systems for accessing peripheral devices connected in the network will be described. The accessing system transmits a large volume of data through the network.

Herein, a term "node" is used for each networked terminal point such as a computer, a word processor, and a workstation. A term "peripheral device" is used for each device connected to each node. Further, a term "network peripheral device" is used for peripheral devices located at nodes connected through the network.

At first, a network peripheral device managing unit on a starting node issues a request for accessing a peripheral device excluded in its own node, and then issues a request for reading the allowable amount of data to be transmitted in one call through the network.

The network peripheral device managing unit on a receiving node receives the request and writes it in the managing unit itself. Then, the network peripheral device managing unit serves to analyze protocol, to process accessing procedure of a peripheral device, to create a response protocol on the basis of the accessed result, and to transmit the response protocol to the network peripheral device managing unit on the starting node.

The network peripheral device managing unit on the starting node serves to receive the response protocol, to store the data contained in the response protocol, to determine whether or not all the requested data is read, if not, it returns to the first step, that is, issuing the request for accessing the peripheral device again, and if yes, it terminates the operation.

This known accessing system will be described in more detail in the following parts with reference to FIGS. 1 and 2. The first and the second known network accessing system, as shown in FIG. 2, includes an application 10, other management 11, a peripheral device management 12, a communication management 13, a peripheral device 14 on a starting (sending) node S1, and other management 17, a communication management 18, a peripheral device management 19, a peripheral device 20 on an accessing (receiving) node S2. Both nodes S1, S2 are connected with each other through a network 15, and are controlled by an operating system (OS) 16.

The above-mentioned first network accessing system is designed to build driver software in an operating system and to load within the driver software a virtual peripheral device system having the different configuration rather than the actual peripheral device configuration for managing accesses of the actual peripheral devices.

Referring to FIGS. 1 and 2, an operation of the network accessing system will be described. At first, a network peripheral device management 12 on a starting node S1 issues a request for accessing a peripheral device excluded in its own node's peripheral device 14 (step ST1) and then a request for reading the allowable amount of data (step ST2) to be transmitted in one call through the network 15 (step ST3). The network peripheral device management 19 on a receiving node S2 receives the request and writes it in itself (step ST4). Then, the network peripheral device management 19 serves to analyze protocol (step ST5), to process accessing procedure of a peripheral device 20 (step ST6), to create a response protocol on the basis of the accessed result (step ST7), and to transmit the response protocol to the network peripheral device management 12 on the starting node S1 (step ST8).

The network peripheral device management 12 on the starting node S1 serves to receive the response protocol (step ST9) to store the data contained in the response protocol (step ST10), to determine whether or not all the requested data is read (step ST11), if not, it returns to the first step (step ST12), that is, issuing the request for accessing the peripheral device 20 again, and if yes, it terminates the operation (step ST13).

Until the reading of all the data is terminated, the steps ST2 to ST11 are repeated. In the process, the communication management 13 has a function of dividing the data into the allowable amount of the data to be sent out in one call through the network 15.

In the next parts, the other one of the above-mentioned systems for accessing peripheral devices connected in the network will be described. The accessing system transmits a large volume of data through the network.

A network peripheral device managing unit on a starting node issues a request for accessing a peripheral device excluded in its own node. Then, the network peripheral device managing unit serves to create a protocol, to divide the protocol, and to pass the divided protocol to a communication managing unit on the starting node. The communication managing unit on the starting node transmits the divided protocol to a communication managing unit on a receiving node. The transmission of the divided protocol between the communication managing units of the starting node and the receiving node is repeated until the total protocol has been transmitted and received.

The later process is likewise to the process described in the former known accessing system. That is, the network peripheral device managing unit on the receiving node serves to analyze the protocol, to execute accessing of the peripheral device, to create a response protocol on the basis of the accessed result, and to transmit the response protocol. The network peripheral device managing unit on the starting node serves to receive the response protocol, to store the data, to determine whether or not all the requested data is read, if not, it returns to the first step, that is, issuing the accessing request again, and if yes, it terminates the process. In the process, the network peripheral device manager on the starting node serves to divide the data into the allowable amount of data to be transmitted in one call through the network.

This latter known accessing system will be described in more detail in the following parts with reference to FIGS. 2 and 3.

The second known system concerns with the network peripheral device accessing system which is designed to build the virtual peripheral device system configured from two or more managing areas for the purpose of managing accessing of the actual peripheral devices.

With reference to FIGS. 2 and 3, the peripheral device management 12 on a starting node S1 which includes peripheral device 14 issues a request for accessing a peripheral device excluded in its own node (step SU1). Then, the peripheral device management 12 serves to create a protocol, to divide the protocol (step SU2), and to pass the divided protocol to a communication management 13 on the starting node S1. The communication management 13 on the starting node S1 transmits the divided protocol to a communication management 18 on a receiving node S2 (SU3). The transmission of the divided protocol between the communication managements 13, 18 of the starting node S1 and the receiving node S2 is repeated until the total protocol has been transmitted and received (SU4).

The later process is similar to the process shown in FIG. 1. That is, the network peripheral device management 19 on the receiving node S2 serves to analyze the protocol (step SU5), to execute accessing of the peripheral device 20 (step SU6), to create a response protocol on the basis of the accessed result (step SU7), and to transmit the response protocol (step SU8). The network peripheral device management 12 on the starting node S1 serves to receive the response protocol (step SU9), to store the data (step SU10), to determine whether or not all the requested data is read (step SU11), if not, it returns to the first step, that is, issuing the accessing request again, and if yes, it terminates the process (step SU12). In the process, the network peripheral device management 12 on the starting node S1 serves to divide the data into the allowable amount of data to be transmitted in one call through the network 15.

The aforementioned two accessing systems may apply to a system for accessing a console located on each node.

However, the above-mentioned accessing systems have the following disadvantages. At first, those systems are required to load a different software system for managing peripheral devices in place of the software used on the traditional operating system, that is, it results in disadvantageously changing the current software resource.

Second, the former known accessing system requires a lot of memory area for realizing the virtual peripheral device system. It results in disadvantageously making the memory area of the system located at each node larger.

Third, the latter known accessing system, on the other hand, requires a small memory area. The division of the protocol on the starting node results in bringing about more frequent communication between the peripheral device managing unit and the communication managing unit and increasing the communications in number, which leads to an appearance of a large overhead.

Further, the both accessing systems require the starting node to wait for the response protocol from the receiving node. It means that the waiting time of the peripheral device management gives a great burden to the peripheral management for the system located at the starting node.

Moreover, the latter accessing system needs to prepare on both of the starting and the receiving nodes a memory area for storing the data to be communicated. The memory area of the starting node is obtainable, because the application run on the node operating system is capable of storing the data. In the receiving node, the node operating system itself has to provide the memory area. The memory area is not negligible and may often give pressure on the memory area to be used for the application.

The foregoing disadvantages are true to the case where those known accessing systems apply to accessing a console located on each node.

In turn, the description will be directed to a high-speed communication buffering control system such as a local area network relevant to the present invention and the foregoing peripheral device or console accessing systems. The currently available local area network (referred to as LAN) means a system including two or more nodes such as a computer, a video display terminal, a workstation and a print server connected through a network in an organic manner.

Currently, on the LAN, each hierarchical layer has been standardized so that a file or a job can be transferred through the LAN in a standard manner.

As a common hierarchical model, it is well known that the International Standardization Organization (ISO) provides an Open Systems Interconnection (OSI) reference model (See the Table 1 as a reference).

TABLE 1

| Level 7 | Application Protocol (User level, that is, service and procedure depending on the application program) |
|---------|---------|
| Level 6 | Presentation Protocol (Data format, code, and conversion and encryption of data) |
| Level 5 | Session Protocol (Interaction between processes, segmentation, control of buffering) |
| Level 4 | Transport Protocol (Control communication between terminals, disassembling and assembling a message, and control of priority) |
| Level 3 | Network Protocol (Management of a network, organizing block and basket, message format) |
| Level 2 | Link Protocol (Initialization, control, stop, and error recovery of data flow) |
| Level 1 | Physical Protocol (Electric interface) |

The OSI reference model includes seven layers (protocol) from the communication layer depending on the control of a communication line to the layer depending on business. The seven layers consist of an application layer (level 7), a presentation layer (level 6), a session layer (level 5), a transport layer (level 4), a network layer (level 3), a link layer (level 3), and a physical layer (level 1) ranged in sequence from the top layer.

The LAN communication protocol includes, for a sending node, an application layer and a presentation layer, a session layer, a transport layer, a network layer, a data link layer, all for the client node, and a physical layer. For a receiving node, the LAN communication protocol includes a data link layer, a network layer, a transport layer, a session layer, an application layer, and a presentation layer, all arranged in data-transmitting sequence.

The aforementioned LAN communication protocol takes the following communication procedure between the sending node and the receiving node on the basis of the hierarchical protocol.

At the sending node, the data to be sent is created on the protocols of the application layer and the presentation layer. Then, at the session layer, a session level header is added to the data. At the transport layer, a transport level header is added to the data. At the network layer, a network level header is added to the data. Last, at the data link layer, a data link level header is added to the data.

The resulting data is sent to the receiving node through an interface unit defined by a physical layer and a transmission medium.

At the receiving node, the data link level header, the network level header, the transport level header, and the session level header are removed from the data in reverse sequence.

Lastly, the data are represented at the application layer and the presentation layer.

Those headers are used as control information. Those headers allow the present LAN to be connected with the other two or more LAN. That is, those headers provide inter-operativity among the LANs.

Each node is configured so that a plurality of protocol software modules are allowed to be linked. Between the hierarchical layers, the data are copied from the layer to the layer.

However, the foregoing LAN system is designed to copy the same data at each hierarchical layer, resulting in increasing the memory areas for the data, making the copying time longer than the protocol processing time, thereby lowering the execution speed. Further, as the data go up from the upper layer to the lower layer, the data to be transferred are excessively pressed within a packet.

Moreover, in case all the layers are standardized, all the protocols of two or more classes are required to be implemented. In actuality, the same software is used on the common portion of the classes without creating the software for each class. Hence, as the classes are increased in number, the process flow for selecting a class appears more frequently, which results in causing an overhead.

The foregoing LAN system provides so large a header at each layer that the effective transmission efficiency of the data to be sent out to a transmission path is made lower. In addition, as the LAN has a lot of hierarchical layers, the processing time becomes longer.

SUMMARY OF THE INVENTION

It is a first object of the present invention to provide a system for accessing devices, which is capable of accessing devices included in the accessing node itself or devices included in another node in a transparent manner without changing the system configuration and the software resource.

The first object of the present invention can be achieved by a system for accessing a plurality of devices connected in a network by using a system call, said system capable of accessing a device connected with any one of nodes through the network, the system includes a unit for detecting a device requested to be accessed and a node connected with the device through the network, a unit for converting the system call into a protocol at a time when the device to be accessed is connected with a different node from which the access is not issued, a unit for transmitting the protocol from the node to the different node through the network, and a unit for reconverting the protocol transmitted into the system call so that the system call is executed.

Preferably, the converting unit is adapted to execute the system call at a time when the device to be accessed is connected with a node from which the access is issued.

More preferably, the detecting unit includes an application for issuing the system call for accessing the device connected with the different node, and a router for detecting whether or not the device to be accessed is located in the node.

Further preferably, the converting unit includes a device managing portion for executing the system call at a time when the device to be accessed is located in the node from which the system call is issued, a network device managing portion located at the node from which the system call is issued for converting the system call into a predetermined protocol at a time when the device to be accessed is not located in the node.

The transmitting unit preferably includes a communication managing portion located at the node from which the system call is issued for transmitting the converted protocol to a communication managing portion located at the different node having the device to be accessed.

The reconverting unit preferably includes a network device managing portion located at the different node having the device to be accessed for reconverting the protocol into the system call originally issued, and a device managing portion located at the different node having the device to be accessed for executing the system call reconverted.

The device to be accessed is preferably a peripheral device connected with any one of nodes through the network.

Preferably, the peripheral device is any one of a printer, display device, a hard disk, an application program, a data base.

In operation, the device accessing system serves to detect a peripheral device to be accessed. If the peripheral device to be accessed is located within the request-issuing node, the system executes a system call. If the peripheral device to be accessed is located in another node, the system converts the system call into a protocol and transfers the protocol to the node having the peripheral device to be accessed through a network. At the node, the protocol is converted into the system call and is executed for accessing the requested peripheral device. Hence, the present device accessing system is capable of transparently accessing a peripheral device included in the system on the starting node or a peripheral device included in the system on another node on the system call level.

It is a second object of the present invention to provide a system for accessing network consoles, which is capable of accessing consoles included in the accessing node itself or consoles included in another node in a transparent manner without changing the system configuration and the software resource.

The second object of the present invention can be achieved by a system for accessing a plurality of devices connected in a network by using a system call, the system capable of accessing a console connected with any one of nodes through the network, the system includes a unit for detecting a console to be accessed in any one of nodes, a unit for executing a system call at a time when the console to be accessed is connected to a node from which the access is issued and for converting the system into a protocol at a time when the console to be accessed is connected with a different node from which the access is not issued, a unit for transmitting the protocol from the node to the different node having the console to be accessed through a transparent interface, and a unit for reconverting the protocol transmitted into the system call and for executing the system call so that the console is accessed to the node from the different node.

In operation, the accessing system serves to detect a console to be accessed. If the console to be accessed is located with in the request-issuing node, the system executes a system call. If the console to be accessed is located in another node, the system converts the system call into a protocol and transfers the protocol to the node having the console to be accessed through a transparent interface. At the node, the protocol is converted into the system call and is executed for accessing the requested console. Hence, the present network console accessing system is capable of transparently accessing a console included in the system on the starting node or a console included in the system on another node on the system call level.

It is a third object of the present invention to provide a LAN system having a high-speed communication buffering function, which is capable of improving the effective transmission efficiency of the data amount sent out to the transmission path and capable of reducing the processing time taken before actually starting the communication.

The third object of the present invention can be achieved by a system for accessing a plurality of devices connected in a network, the system having a plurality of hierarchical layers at a node from which an access is issued and adapted to transmit data through the network, the system includes a first unit for storing the data so that the data at each of the plurality of hierarchical layers are managed to be transmitted from the node to a different node, a unit for dividing the data into a plurality of packets at a time when the data is subjected to the same process and has the same header in each of the plurality of hierarchical layers, each of the plurality of packets having a pointer, and a second unit for storing the data so that the stored data are used for rewriting the pointer of each of the plurality of packets indicated by the same header before transmitting the plurality of packets to the network.

Preferably, the first storing unit is a management descriptor table having a pointer for pointing to a next upper hierarchical layer, a data storage pointer of each hierarchical layer, and a storage area for storing a header length.

More preferably, the second storing unit is a data pointer management table for storing a data pointer of each of the plurality of packets.

Further preferably, the plurality of hierarchical layers are composed of an application layer, a presentation layer, a session layer, a transport layer, a data link layer, and a physical layer on any one of the nodes.

The application layer is capable of dividing data thereon into the plurality of packets at a time when a large volume of divided packets are transmitted, preferably.

The system is preferably adapted to be used for an intelligent board system capable of dividing a responsibility for managing the plurality of hierarchical layers into two kinds of responsibilities, one of the responsibilities being for managing the application layer, the presentation layer, and the session layer, and the other one of the responsibilities being for managing remaining layers in the plurality of hierarchical layers.

The system is preferably adapted to be used for a non intelligent board system capable of dividing a responsibility for managing the plurality of hierarchical layers into two kinds of responsibilities, one of the responsibilities being for managing the application layer to the network layer, and the other one of the responsibilities being for managing the data link layer.

In operation, the data of each layer is managed on the first management table. If the data is subject to the same process and has the same header at each layer, the data contained in the application is divided into packets. The pointer of the divided data indicated by the same header is rewritten before transmitting the data by referring the second management table. If, on the other hand, the data is not subject to the same process and does not have the same header at each layer, the protocol process and the header creation are carried out at each layer, so that the header information is written in the first management table and the data is transferred to the next lower layer. Hence, the operation makes it possible to reduce the processing time taken before starting the communication and minimize the data transfer processing, and improve the effective transmitting efficiency of the data to be actually sent out to the transmission path.

It is a fourth object of the present invention to provide a LAN system having a high-speed communication bus window function, which is capable of improving the effective transmission efficiency of the data amount sent out to the transmission path and capable of reducing the processing time taken before actually starting the communication.

The fourth object of the present invention can be achieved by a system for accessing a plurality of devices connected in a network, the system having a plurality of hierarchical layers at a node from which an access is issued and adapted to transmit data through the network, the system includes a first memory map having a plurality of areas for sequentially storing each particular address to be written for a first address group thereof, a second memory map having a plurality of areas for sequentially storing each particular address to be written for a second address group thereof, and a bus window circuit for mapping a particular area of the second memory map into a particular area of the first memory map for passing an address pointer indicating a header to be transmitted.

Preferably, the first memory map is composed of an operating system area, an application area formed on an OSI reference model, and a communication data area.

More preferably, the second memory map is composed of a control software area, a header information area, and a buffer area for each of packet data.

Further preferably, the bus window circuit is adapted to map the buffer area of the second memory map into the communication data area of the first memory map.

In operation, the first memory map serves to sequentially write each particular address from a first address group to the corresponding address of the first memory map. Then, the second memory map serves to sequentially write each particular address from the second address group to each area of the second memory map. The bus window circuit serves to map a particular area of the second memory map into a particular area of the first memory map and read and write the data on the mapped area so as to pass an address pointer indicating the head of the data from one layer to another.

Further objects and advantages of the present invention will be apparent from the following description of the preferred embodiments of the invention as illustrated in the accompanying drawings.

BRIEF DESCRIPTION OF THE DRAWINGS

FIG. 18, which consists of FIGS. 18A~18F, is an explanatory view showing a descriptor table of the data link layer to the application layer employed in the accessing system shown in FIG. 15;

DESCRIPTION OF THE PREFERRED EMBODIMENTS

Referring to the accompanying drawings, the embodiments of a system for accessing peripheral devices connected in a network in the present invention will be described in details, in the following parts.

The first and the second embodiments of the present invention will be described with reference to FIGS. 4 and 5.

Figure 1:
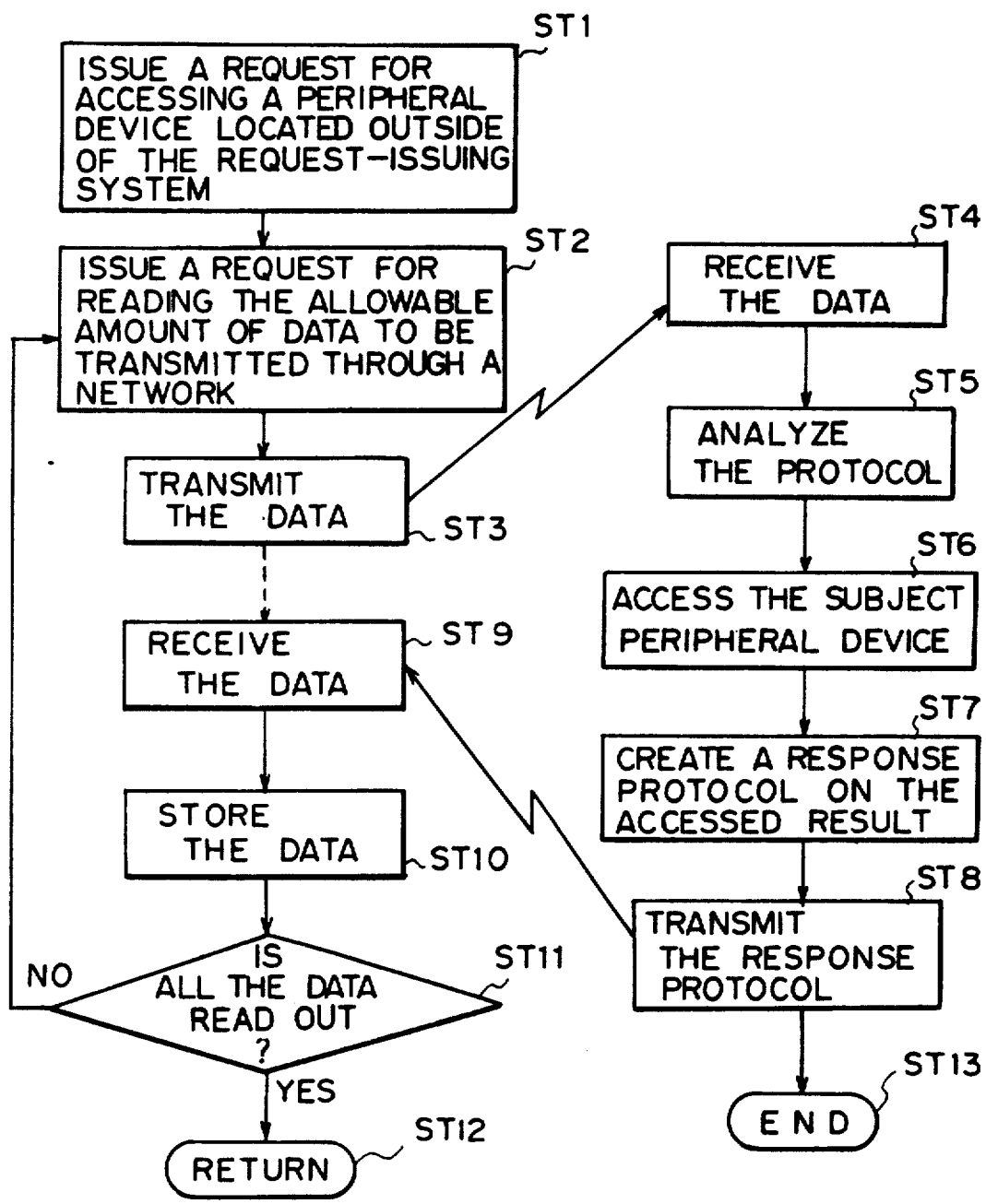
FIG. 1 is a flowchart showing the operating process of the known network device accessing system in which driver software is built in the existing operating system.
Figure 2:
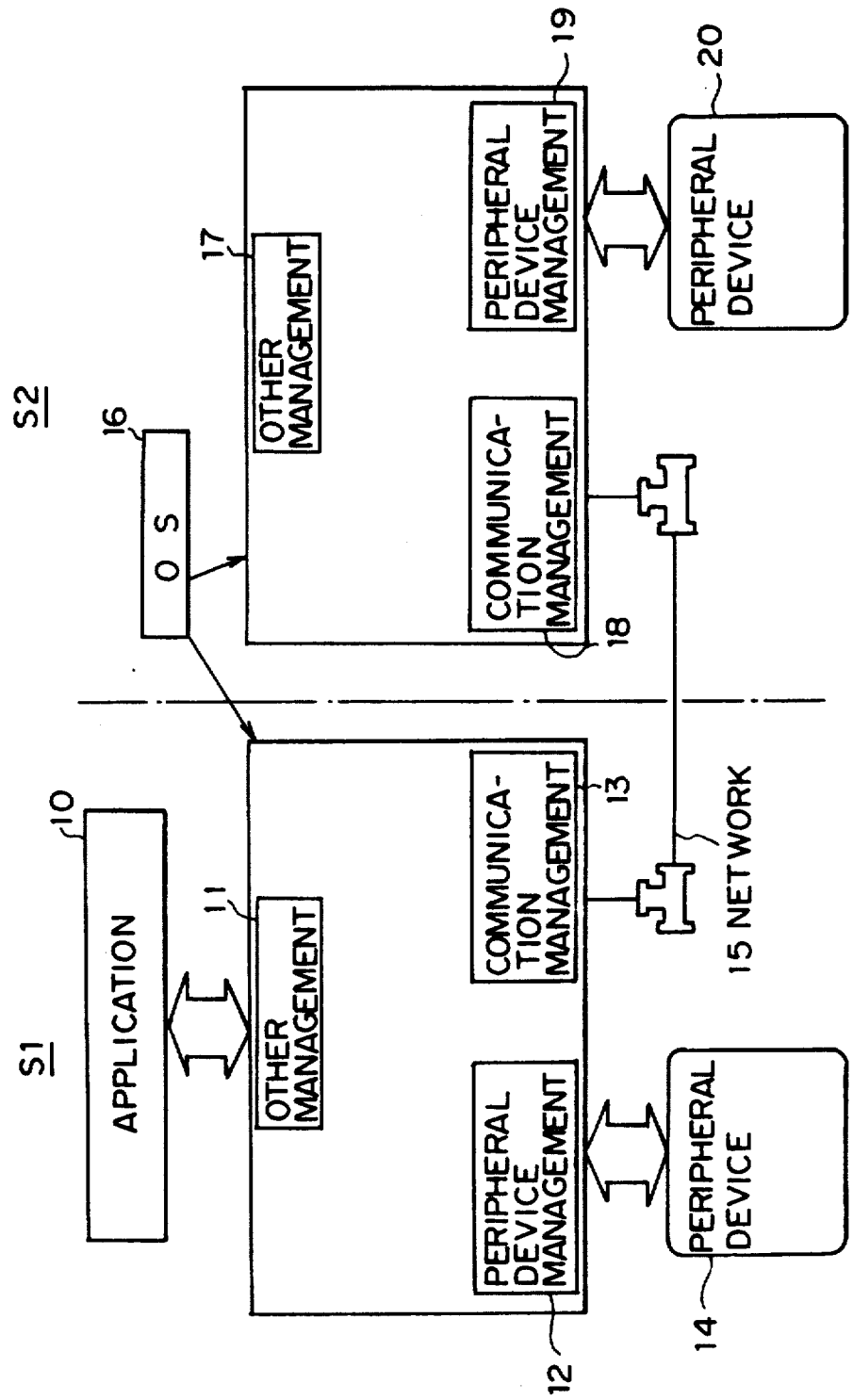
FIG. 2 shows an example of the known accessing system using a distributed operating system.
Figure 3:
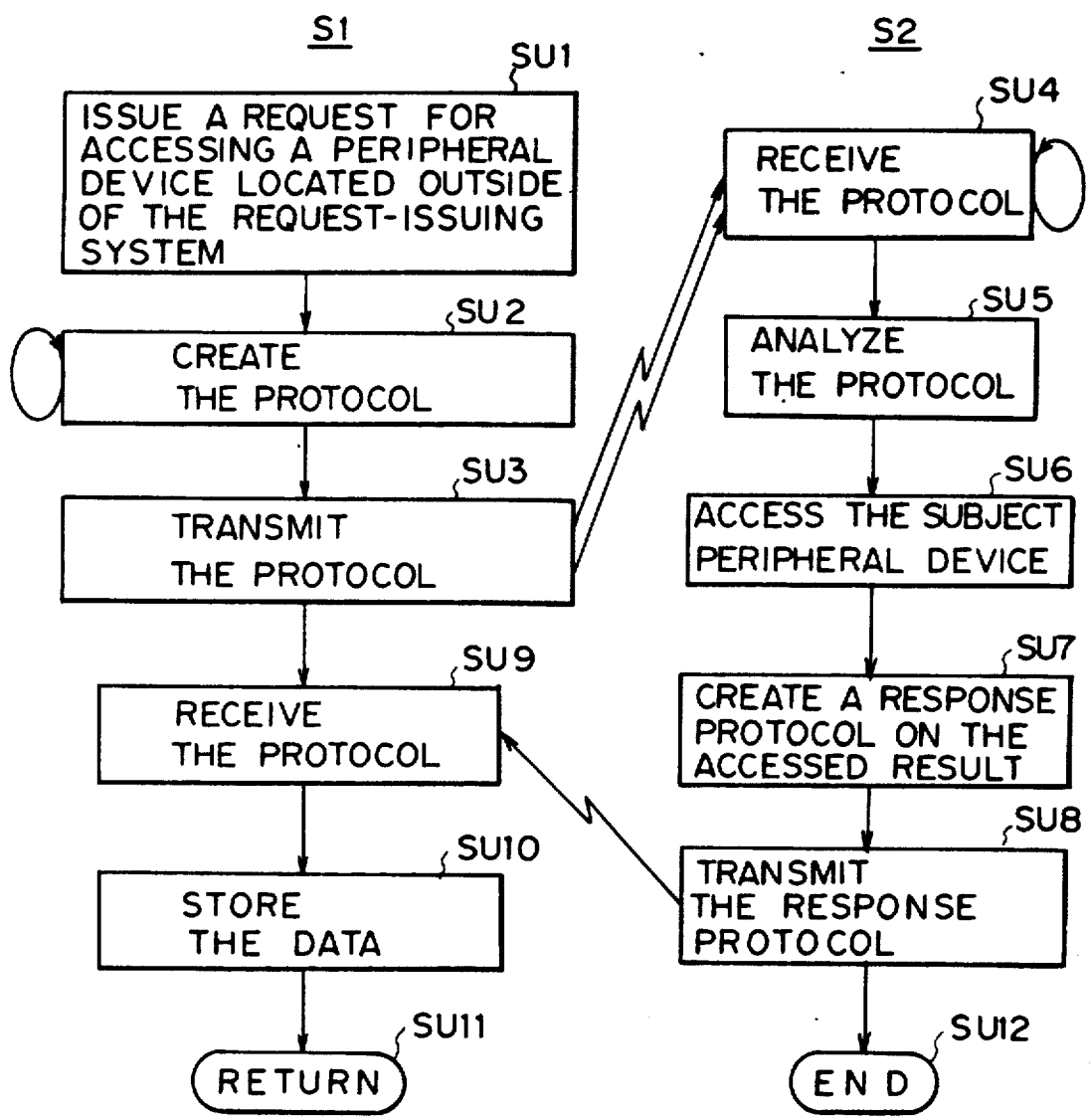
FIG. 3 is a flowchart showing the operating process of the network peripheral device accessing system using the distributed operating system shown in FIG. 2.
Figure 4:
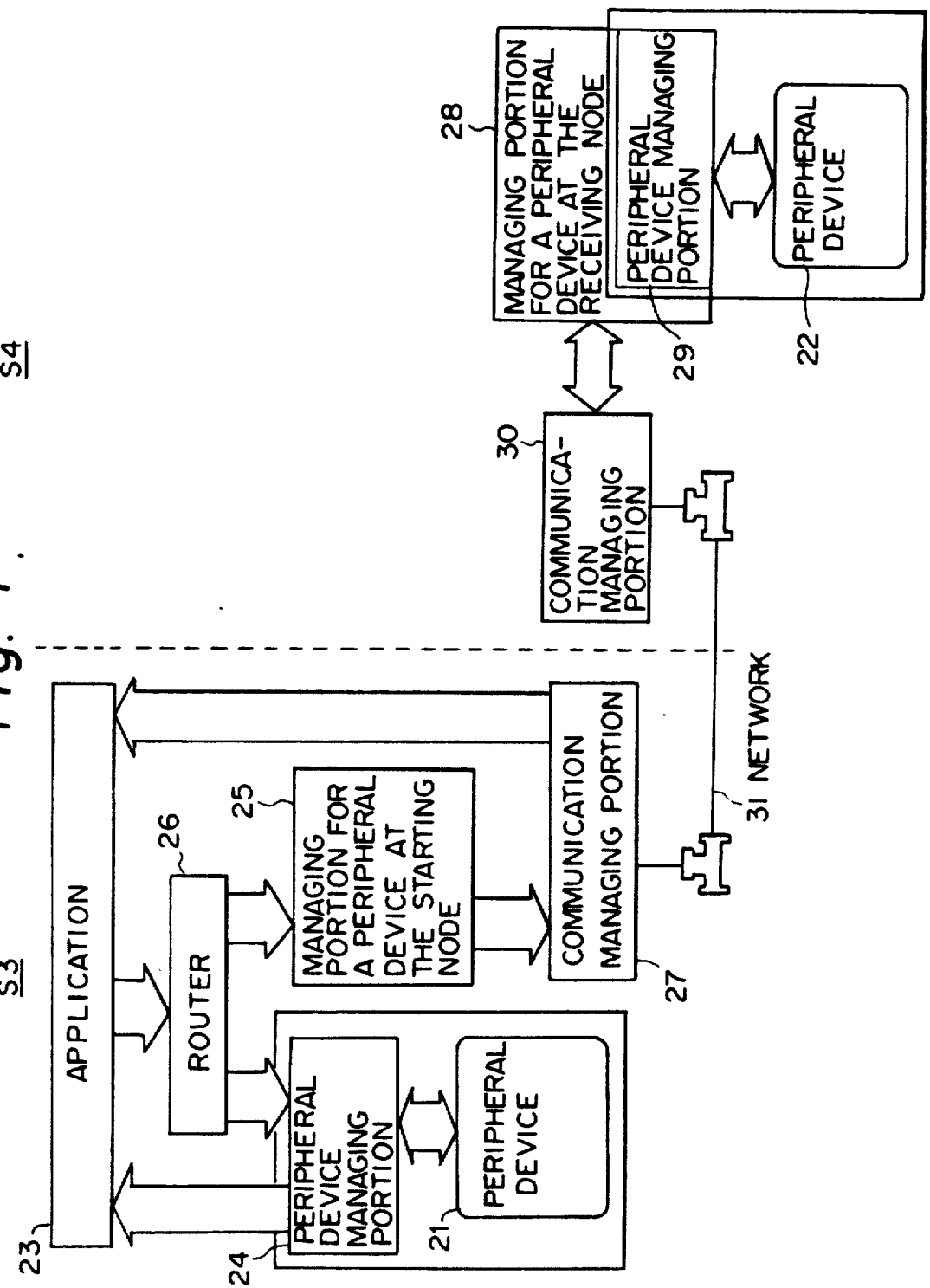
FIG. 4 is a diagram showing a network peripheral device accessing system operated in a transparent communication management manner according to a first embodiment of the present invention.
Figure 5:
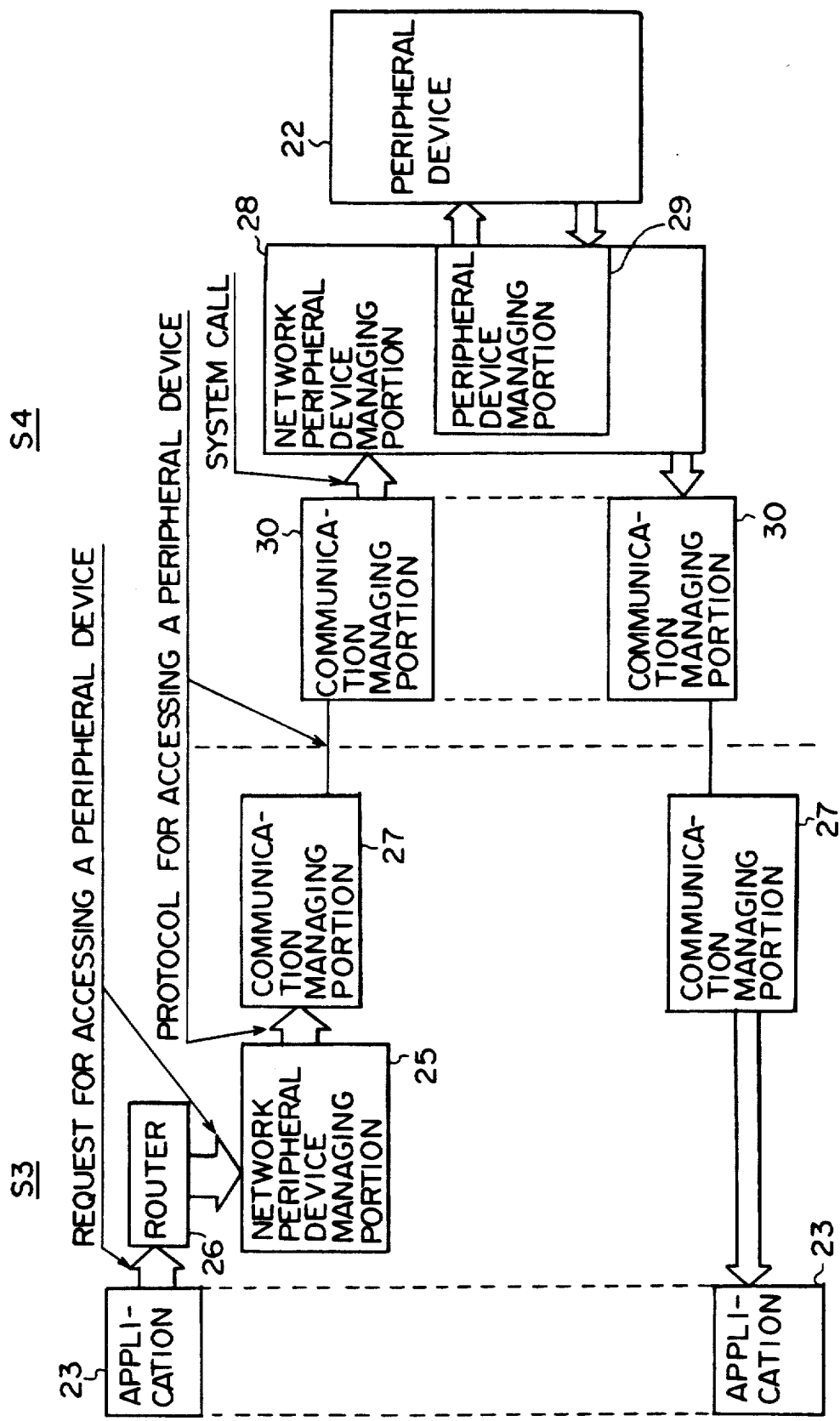
FIG. 5 is a view showing the operating process of the network peripheral device accessing system shown in FIG. 4.

FIG. 4 shows the network peripheral device accessing system, and FIG. 5 shows the process executed in the network peripheral device accessing system shown in FIG. 4.

With reference to FIGS. 4 and 5, the system S3 located on the starting node is configured to have an application 23 for issuing a request for accessing a peripheral device 21 relevant to the system S3 on the starting node and a request for accessing a peripheral device 22 relevant to a system S4 on a receiving node S4 and a router 26 for passing the access request to a peripheral device managing portion 24 served as a unit for managing a peripheral device if the application 23 issues the request for accessing a peripheral device 21 relevant to the system S3 and passing the access request to a network peripheral device managing portion (referred to as NPM) 25 served as a unit for managing a network peripheral device if the application 23 issues the request for accessing a peripheral device 22 relevant to the system S4 on the receiving node. Herein, the NPM 25 on the starting node serves to convert the access request passed from the router 26 into a protocol.

The system S3 on the starting node further includes a communication managing portion 27 serving as transmitting the protocol converted by the NPM 25 on the starting node to the system S4 on the receiving node, receiving a response protocol from the system S4, and processing the data such as fragmentation of the data.

The system S4 on the receiving node includes a communication managing portion 30 serving as receiving and interpreting the protocol sent from the communication managing portion 27 on the starting node, accessing the peripheral device 22 through a peripheral device managing portion 29 modified by an NPM 28 on the receiving node, and transmitting the response protocol to the communication managing portion 27 on the starting node. The communication managing portion 30 serves to carry out the processing of the allowable amount of data in the network.

Figure 6:
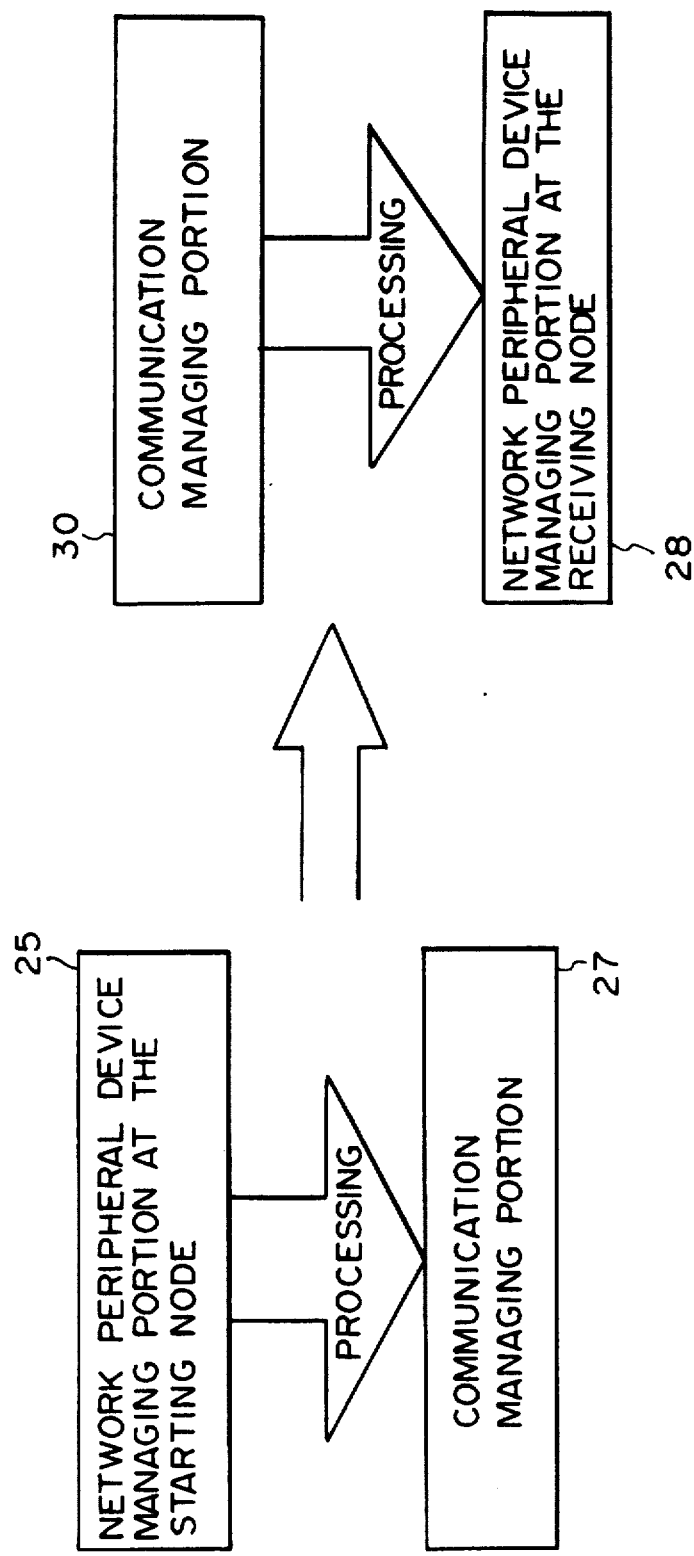
FIG. 6 is a view showing the summary of the operating process shown in FIG. 5.

FIG. 6 illustrates the summary of the foregoing process.

Figure 7:
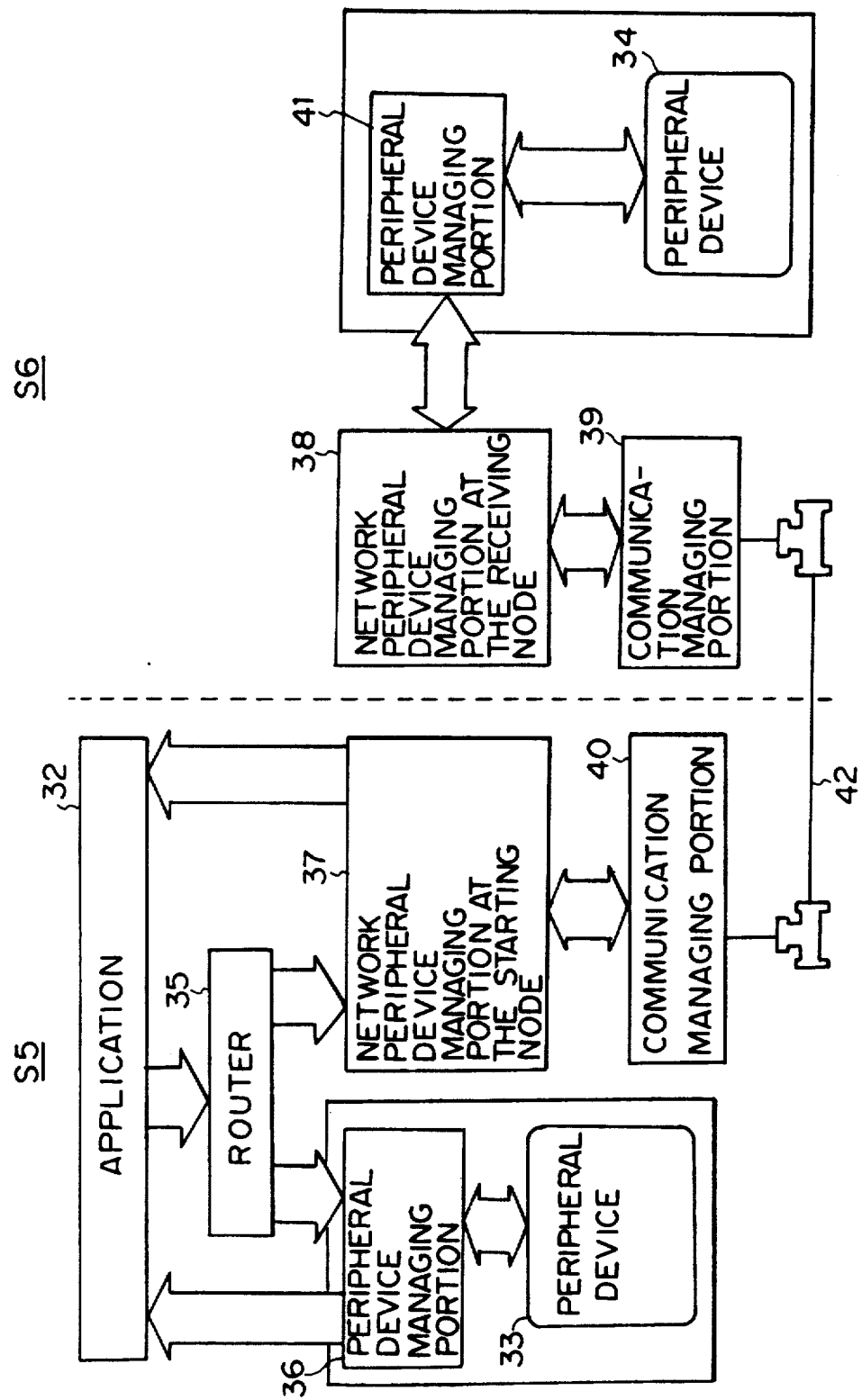
FIG. 7 is a diagram showing the network peripheral device accessing system operated in a data transparent communication managing manner according to an improvement of the first embodiment.
Figure 8:
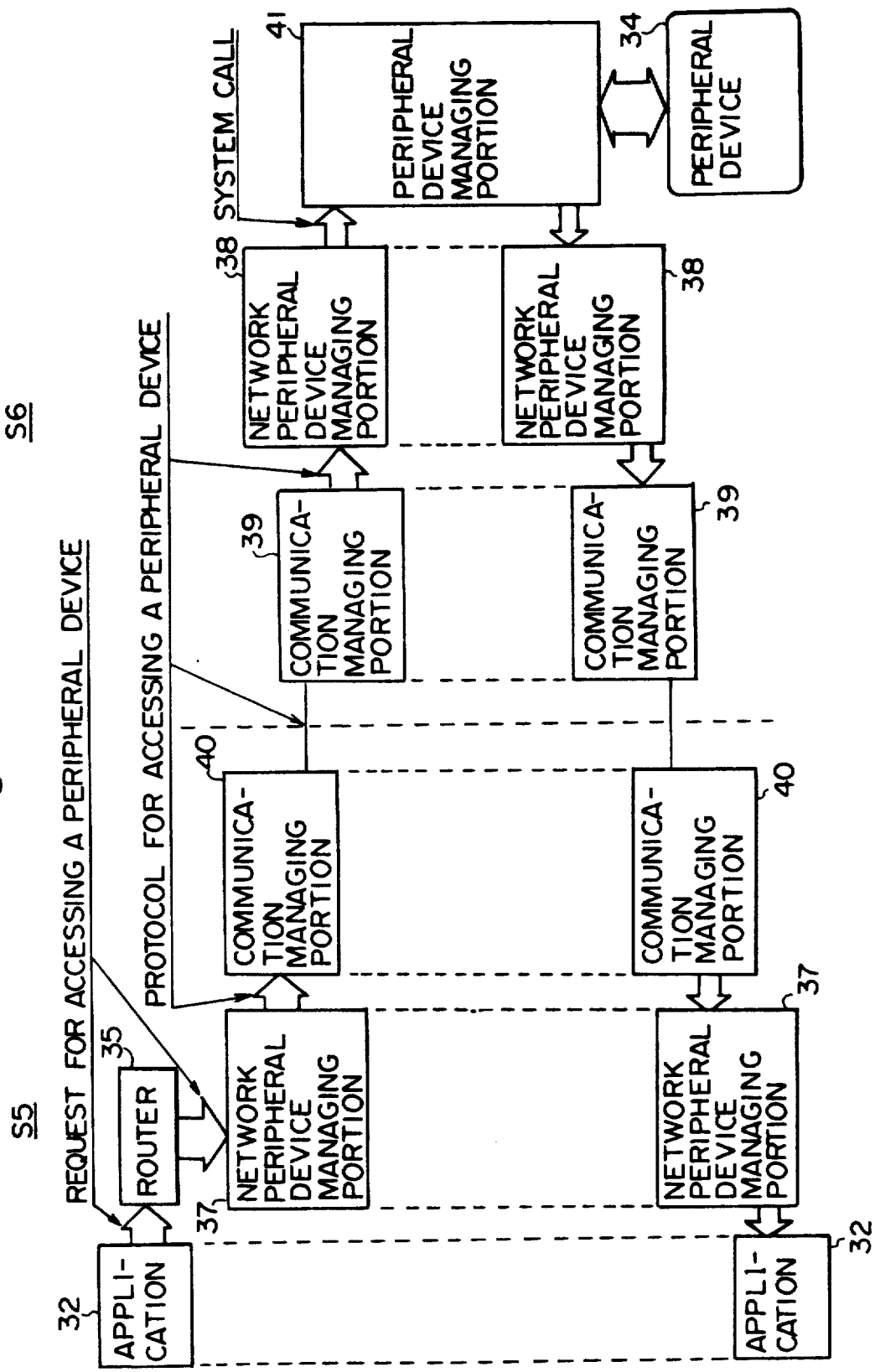
FIG. 8 is a diagram showing the operating process of the network peripheral device accessing system shown in FIG. 7.

Next, an improvement of the first embodiment will be described with reference to FIGS. 7 and 8.

Like the system S3 of the first embodiment, the system S5 located on the starting node is configured to include an application 32 and a router 35. The application 32 issues a request for accessing peripheral devices 33, 34 to the router 35. The router 35 passes the request to a peripheral device managing portion 36 in case it is a request for accessing the peripheral device 33 relevant to the system S5 itself and to an NPM 37 served as a unit for managing peripheral devices contained in the network if the request is for accessing the peripheral device 34 relevant to the system S6, that is, the system located on another node (receiving node).

In response to the request, the NPM 37 on the starting node converts the request into the predetermined protocol matching to that of an NPM 38 on the receiving node and gives to a communication managing portion 40 on the starting node an instruction about transmitting the protocol to a communication managing portion 39 on the receiving node.

The communication managing portion 40 on the starting node transmits the protocol to the communication managing portion 39 on the receiving node in accordance with the instruction given by the NPM 37. The communication managing portion 39 on the receiving node passes the protocol to the NPM 38 on the receiving node.

The NPM 38 on the receiving node interprets the protocol and serves to access the peripheral device 34 through a peripheral device managing portion 41. Then, the NPM 38 on the receiving node serves to convert the accessed result of the peripheral device 34 into the predetermined protocol and to request the communication managing portion 39 in order to send to the response protocol back to the communication managing portion 40 from which the response protocol is given back to the NPM 37 on the starting node.

The NPM 37 on the starting node serves to interpret the response protocol and to give back the result to the application 32. Then, the process is terminated.

The protocol used on the system S5 contains a flow from the data transmission flow and the data reception flow. At least the NPM 37 is configured to have the synchronized data-transmitting process with the data-receiving process. If the data-transmitting process is desired to be asynchronous to the data-receiving process in the NPM 38, the NPM 37 itself executes the asynchronous process.

The amount of data to be transmitted in one call through the network 42 is limited depending on the used hardware. In general, the amount of data to be transferred through the network 42 is far smaller than the amount of data to be transferred to the peripheral device 33 within the system at a node.

Figure 9:
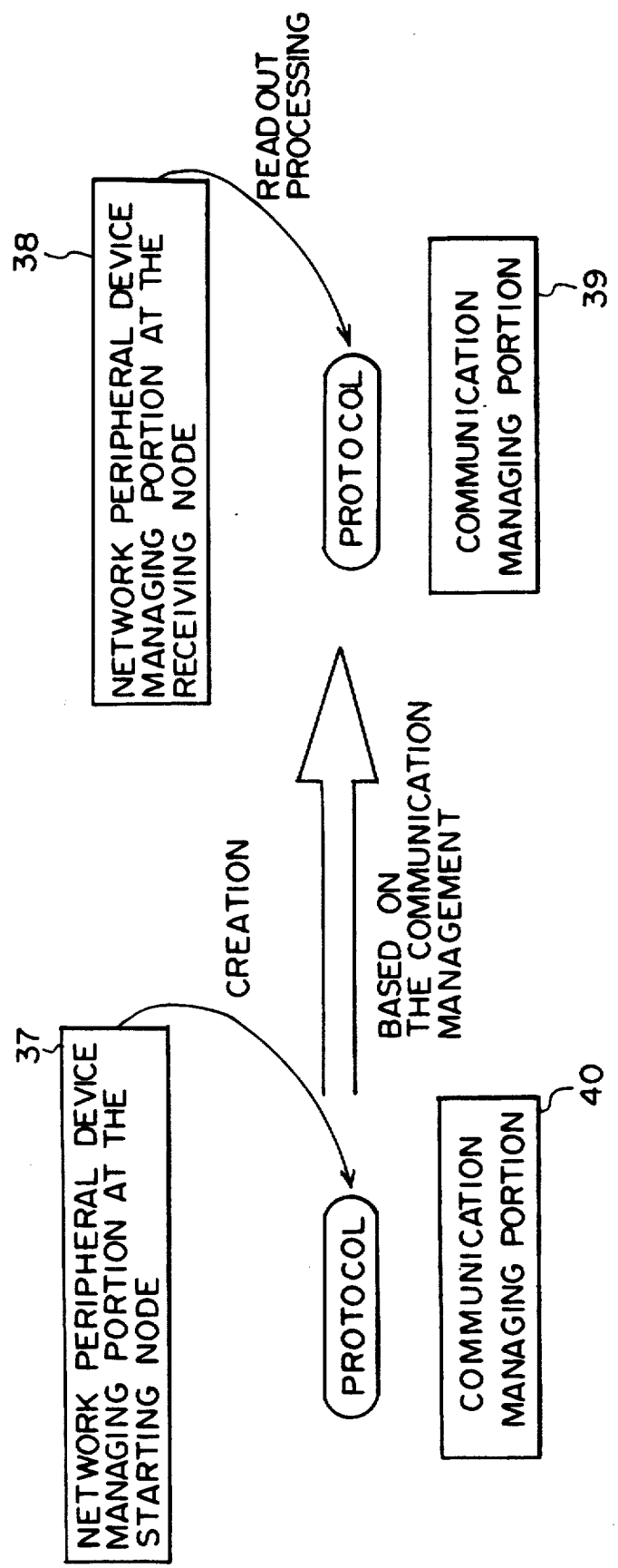
FIG. 9 is a view showing the summary of the operating process shown in FIG. 8.

The summary of the foregoing process is illustrated in FIG. 9.

Figure 10:
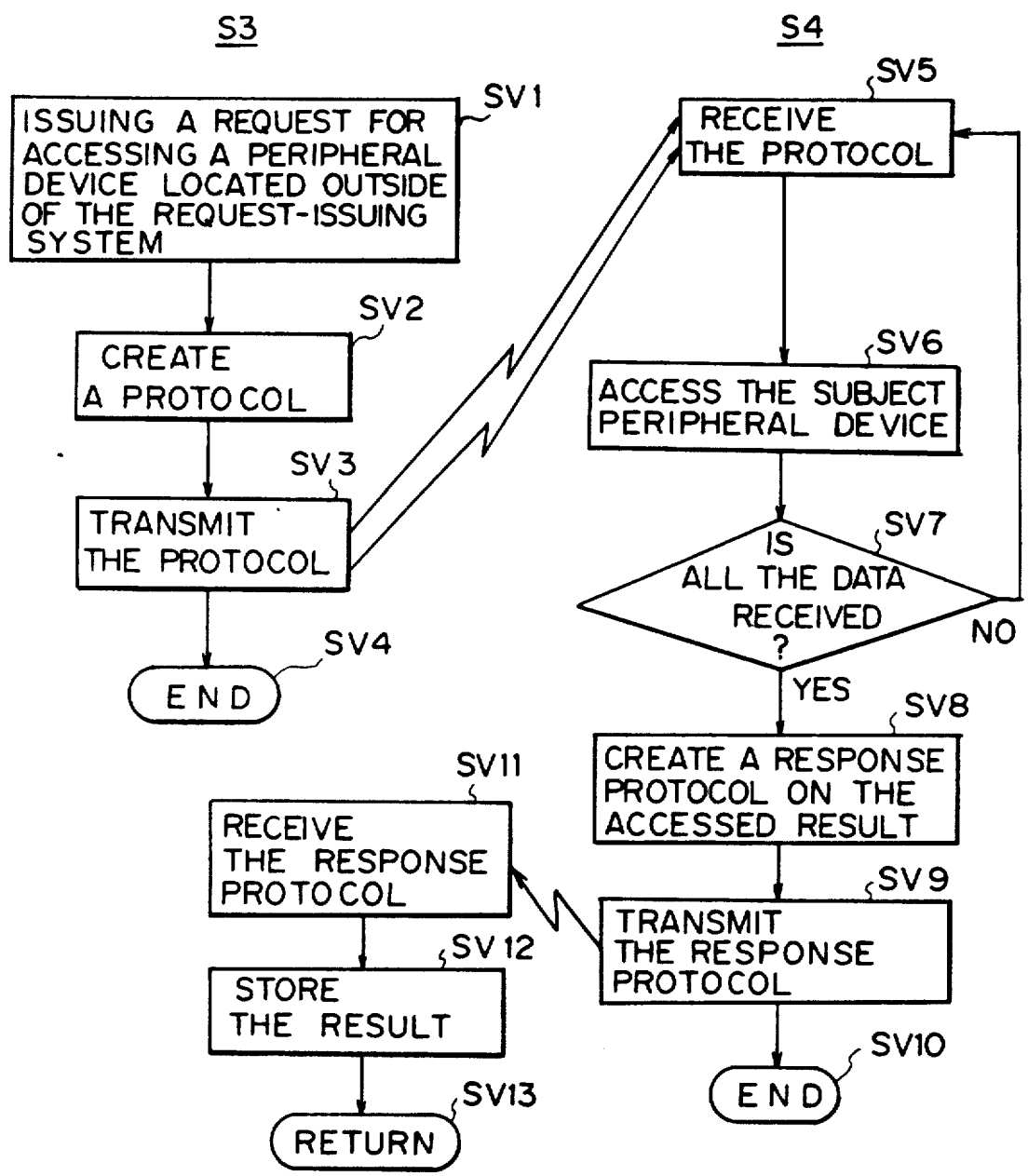
FIG. 10 is a flowchart showing the network peripheral device accessing system shown in FIG. 5.

FIG. 10 is a flowchart illustrating the operation of the first embodiment and its improvement. For simplifying the illustration, the operation is based on the first embodiment shown in FIG. 4.

At first, in the system S3 on the starting node, the application 23 issues a request for accessing the peripheral device 22 located outside of the starting node itself (step SV1). The NPM 25 on the starting node serves to convert the access request into the predetermined protocol matching to the protocol used in the NPM 28 on the receiving node (step SV2) and request the communication managing portion 27 on the starting node to transmit the protocol to the system S4 on the receiving node.

The communication managing portion 27 on the starting node, to begin with, notifies the communication managing portion 30 on the receiving node of data transmission and then transmits the data in sequence (step SV3). When all the data is transmitted, the communication managing portion 27 terminates its process (step SV4).

In response to the data sent from the starting node (step SV5), the communication managing portion 30 recognizes that the received data is to be written and then sequentially writes the data in the NPM 28 so that the NPM 28 is allowed to execute accessing to the peripheral device 22 (step SV6).

When all the data is received (step SV7), the communication managing portion 30 serves to convert the written result into the response protocol (step SV8) and transmit the response protocol (step SV9). Then, the process is terminated (step SV10).

The communication managing portion 27 included in the system S3 on the starting node serves to receive the response protocol and interpret it (step SV11), store the interpreted result (step SV12), and passes the control to the application 23 (step SV13). The data-transmitting process of the communication managing portion 27 on the starting node (step SV13) is independent of the data-receiving process of the portion 27 (step SV11).

According to the first embodiment, hence, when the communication managing portion 30 on the receiving node receives the protocol from the communication managing portion 27 on the starting node, interprets the protocol and accesses the peripheral device 22 through the peripheral device managing portion 29 modified by the NPM 28, the communication managing portion 30 enables to perform the processing of the amount of the data limited depending on the network. The system S4 on the receiving node is required to merely obtain a minimum storage area.

The present embodiment requires only one exchange of the data between the NPM 25 and the communication managing portion 27 of the system S3 on the starting node and is capable of processing the response protocol independently of the operation of the NPM 25 on the starting node. These features make it easier to develop, maintain, and expand the system on each node included in the network. The data-receiving process is allowed to be carried out in parallel to the communication of the data between the systems on the nodes included in the network such as an electronic mail.

Figure 11:
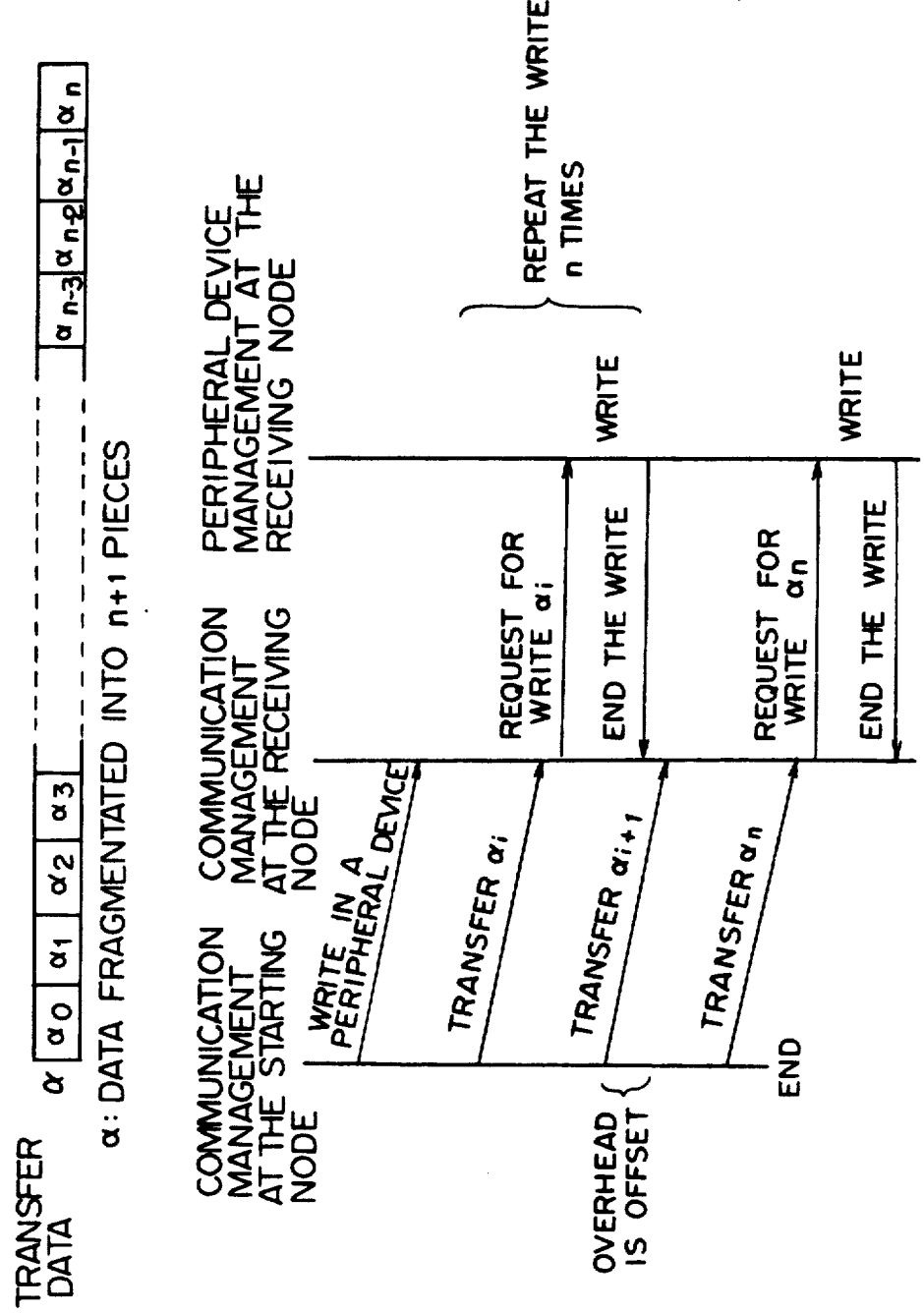
FIG. 11 is an explanatory view showing the arrangement and the action of the transfer data when transferring a protocol.

FIG. 11 is a view schematically showing the arrangement and the operation of the transfer data to be transferred as the protocol.

The transfer data $a$ is fragmentated into $N+1$ pieces of data from $a_0$ to $a_n$. As shown, each piece of data $a_0$ to $a_n$ is sequentially transferred from the communication managing portion on the starting node to the communication managing portion on the receiving node. As these pieces of data are transferred in sequence, the transferred pieces of data are sequentially written from the communication managing portion on the receiving node to the peripheral device managing portion on the receiving node.

Each time the piece of data is written, the peripheral device managing portion on the receiving node transmits a response indicating the termination of the write to the communication managing portion on the receiving node.

Figure 12:
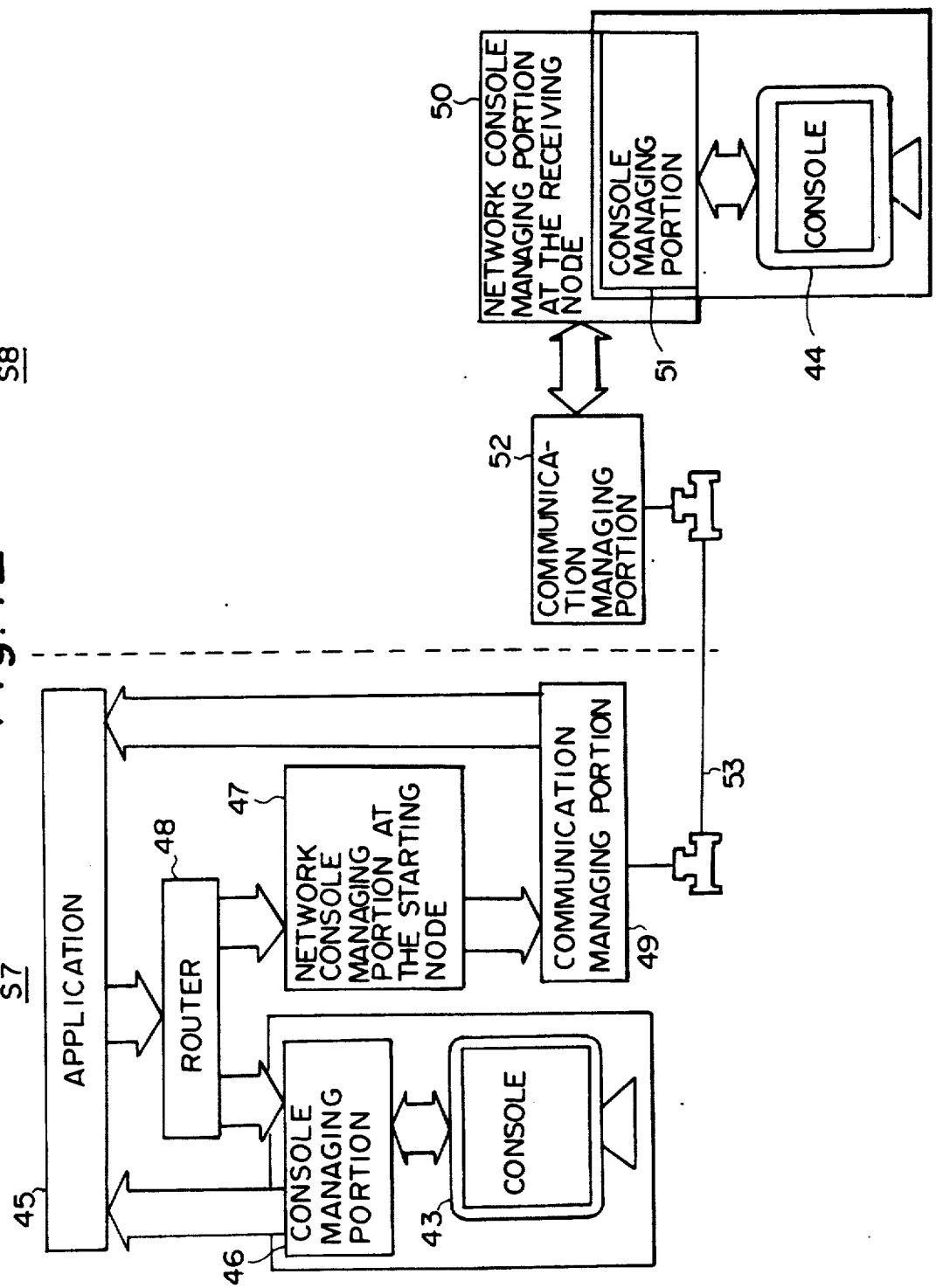
FIG. 12 is a diagram showing a network console accessing system operated in a transparent communication managing manner according to a second embodiment of the present invention.
Figure 13:
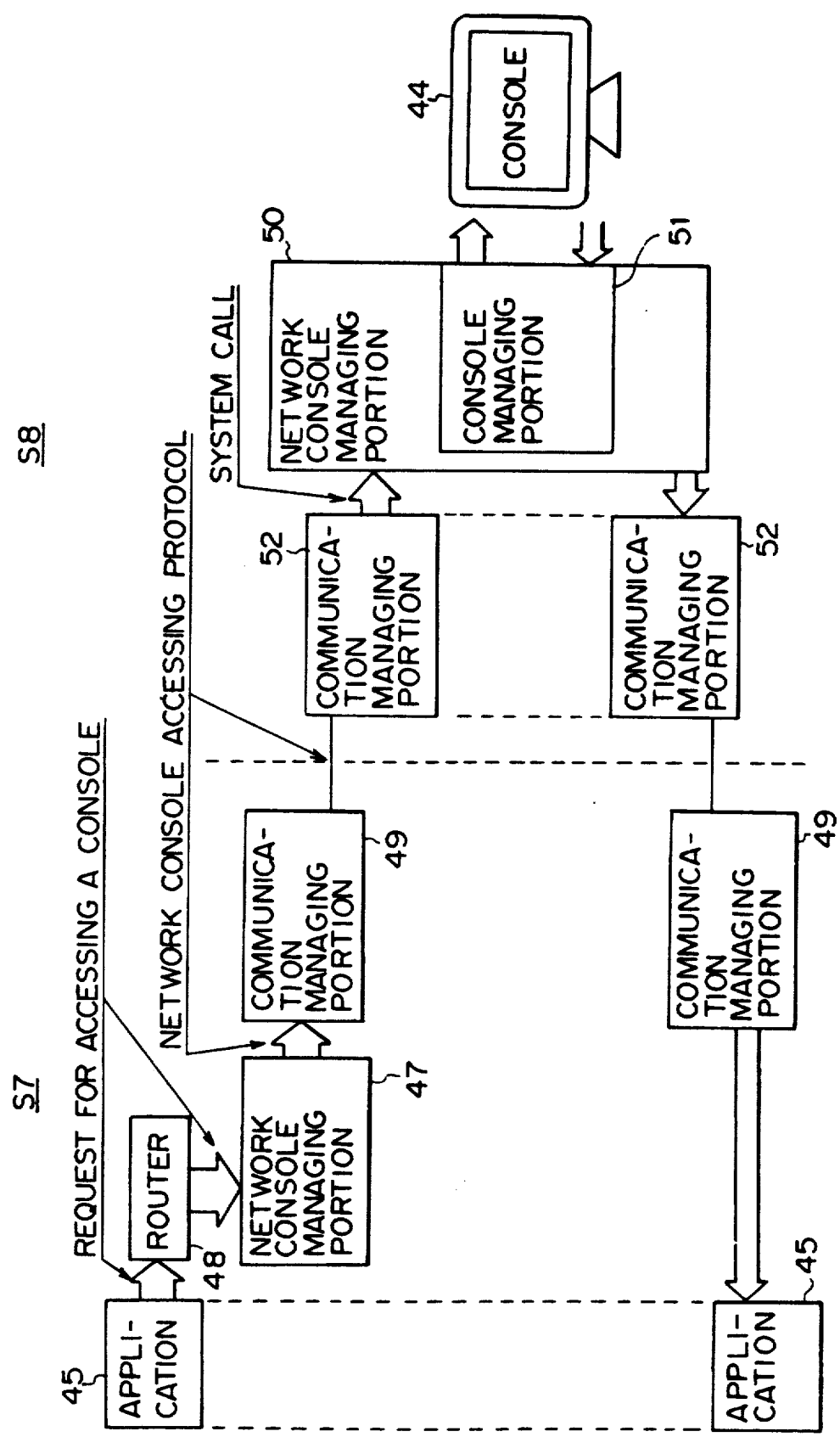
FIG. 13 is a diagram showing the operating process of the network console accessing system shown in FIG. 12.

In turn, the description will be directed to a second embodiment of the present invention with reference to FIG. 12 and 13.

As shown in FIGS. 12 and 13, the second embodiment is likewise to the first embodiment except that the console is to be accessed in place of the peripheral device. Hence, the description will be limited to the arrangement of the second embodiment. The description about the accessing operation of this embodiment is left out, because the accessing operation is the same as that of the first embodiment.

FIG. 12 shows the system for accessing a console connected to a system on each node included in a network (referred to as a network console accessing system). FIG. 13 shows the process executed in the network peripheral device accessing system.

With reference to FIGS. 12 and 13, the system S7 located on the starting node is configured to have an application 45 for issuing a request for accessing a console 43 contained in the system S7 on the starting node and a request for accessing a console 44 contained in the system S8 on the receiving node and a router 48 for passing the access request to a console managing portion 46 served as a unit for managing a console if the application 45 issues the request for accessing a console 43 contained in the system S7 and passing the access request to a network console managing portion (referred to as NCM) 47 served as a unit for managing a console included in the network if the application 45 issues the request for accessing a console 44 contained in the system S8 on the receiving node. Herein, the NCM 47 on the starting node serves to convert the access request passed from the router 48 into a predetermined protocol.

The system S7 on the starting node further includes a communication managing portion 49 serving as transmitting the protocol converted by the NCM 47 on the starting node to the system S8 on the receiving node, receiving a response protocol from the system S8, and processing the data such as fragmentation of the data.

The system S8 on the receiving node includes a communication managing portion 52 serving as receiving and interpreting the protocol sent from the communication managing portion 49 on the starting node, accessing the console 44 through a console managing portion 51 modified by an NCM 50 on the receiving node, and transmitting the response protocol to the communication managing portion 49 on the starting node. The communication managing portion 52 serves to carry out the processing of the allowable amount of data in the network 53.

In turn, the description will be directed to a third embodiment of the present invention. As described above, the third embodiment concerns with the local area network providing a high-speed communication buffering control function.

Figure 14:
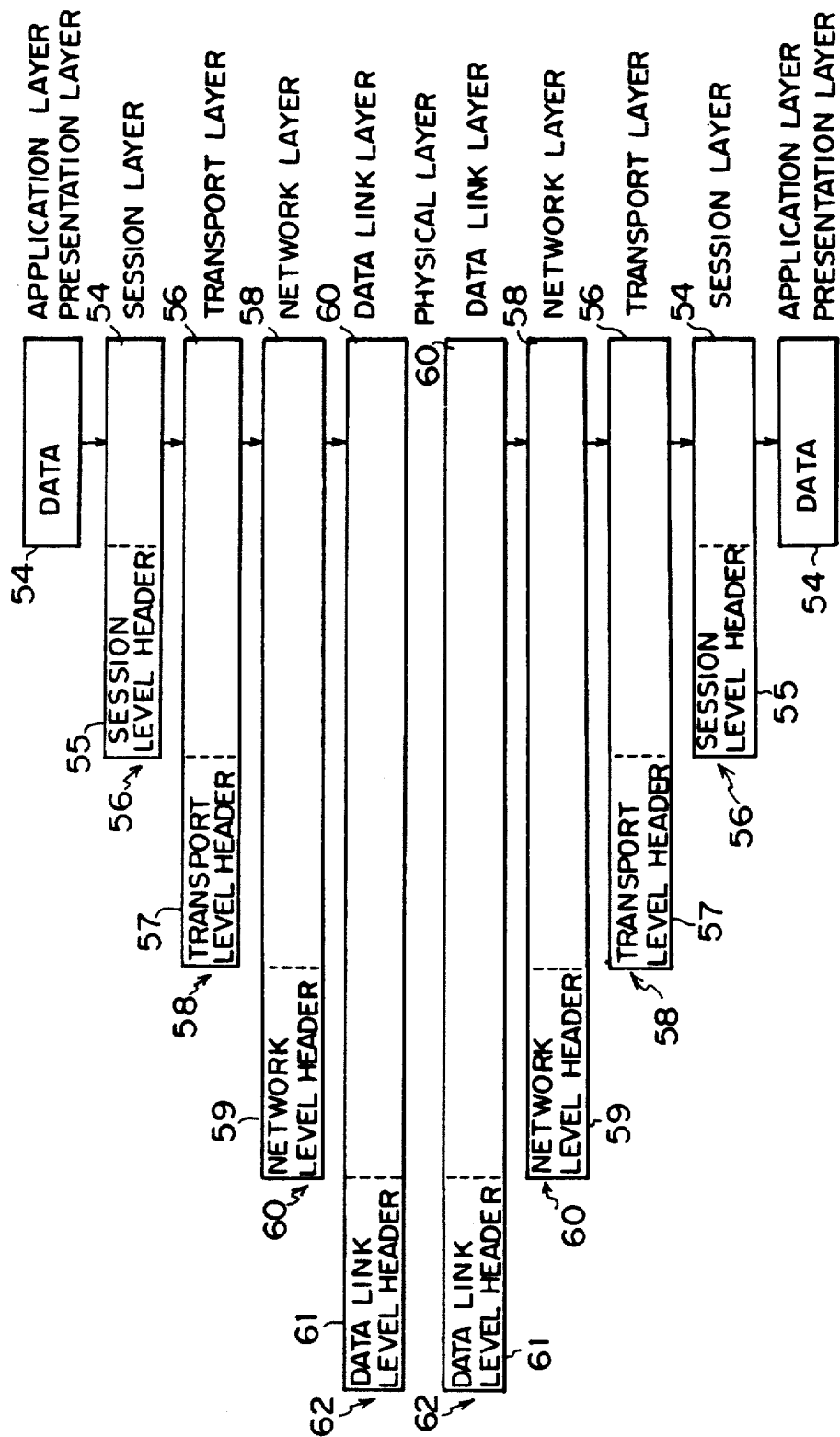
FIG. 14 is an explanatory view showing the operations of the transmitting node and the receiving node implemented in the known local area network.

As shown in FIG. 14, the LAN communication protocol includes, for a sending node, an application layer and a presentation layer, a session layer, a transport layer, a network layer, a data link layer, all for the sending node, a physical layer, and, for a receiving node, a data link layer, a network layer, a transport layer, a session layer, and an application layer and a presentation layer, all ranged in data transmitting sequence.

The aforementioned LAN communication protocol takes the following communication procedure between the sending node and the receiving node on the basis of the hierarchical protocol.

At the sending node, the data 54 to be sent is created on the protocols of the application layer and the presentation layer. Then, at the session layer, a session level header 55 is added to the data 54 on the basis of the protocol of the session layer, resulting in producing the session-layer data 56. At the transport layer, a transport level header 57 is added to the session layer data 56 on the basis of the protocol of the transport layer, resulting in producing the transport-layer data 58. At the network layer, a network level header 59 is added to the transport-layer data 58 on the basis of the protocol of the network layer, resulting in producing the network-layer data 60. Last, at the data link layer, a data link level header 61 is added to the network-layer data 60 on the basis of the protocol of the data link layer, resulting in producing the data-link-layer data 62.

The resulting data 62 is sent to the receiving node through an interface unit defined by a physical layer and a transmission medium.

At the receiving node, the data link level header, the network level header, the transport level header, and the session level header are removed from the data in reverse sequence.

Lastly, the data are represented at the application layer and the presentation layer.

Those headers are used as control information. Those headers allow the present LAN to be connected with the other two or more LAN. That is, those headers provide inter-operativity among the LANs.

Each node is configured so that a plurality of protocol software modules are allowed to be linked. Between the hierarchical layers, the data is copied from the layer to the layer.

Next, the third embodiment of the present invention will be described.

Figure 15:
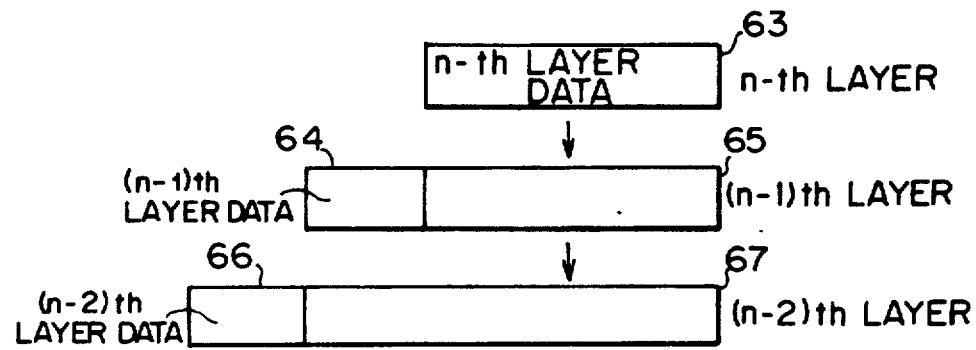
FIG. 15 is an explanatory view showing the transmission and the reception of the data done between the layers of the network system-connected device accessing system providing a high-speed communication buffering control device according to a third embodiment of the present invention.

FIG. 15 schematically illustrates how the data is passed between the layers on the basis of the high-communication buffering control function, which is the feature of the third embodiment.

As shown, n denotes a positive integer. 63 denotes the data located at the n-th layer. The n-th layer data 63 is passed to the (n−1)th layer in which a (n−1)th layer head 64 is added to the n-th layer data 63, resulting in producing the (n−1)th layer data 65. The (n−1)th layer data 65 is passed to the (n−2)th layer in which a (n−2)th layer head 66 is added to the (n−1)th layer data 65, resulting in producing the (n−2)th layer data 67.

Figure 16:
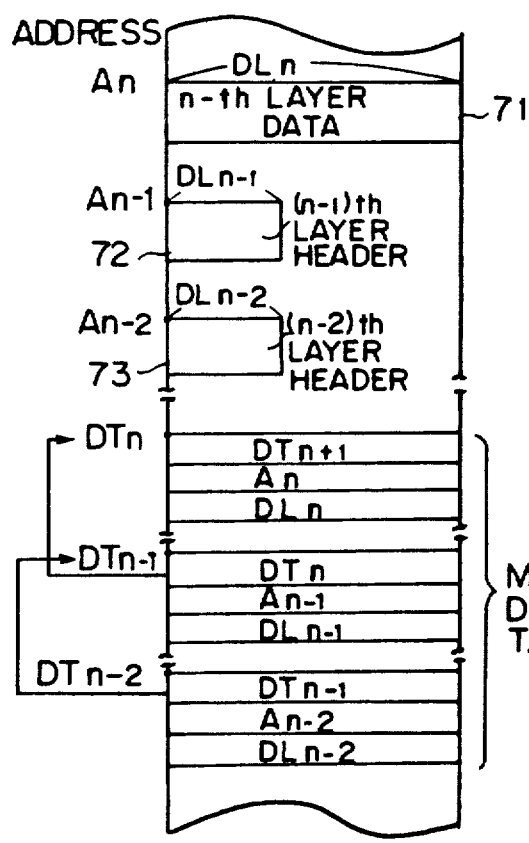
FIG. 16 is an explanatory view showing the actual physical structure of the accessing system shown in FIG. 15.
Figure 17:
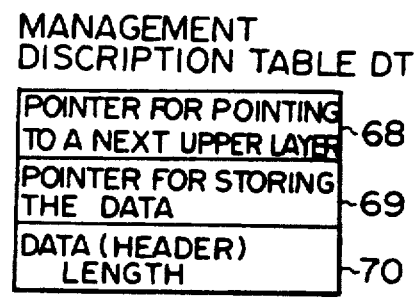
FIG. 17 is an explanatory view showing a management descriptor table included in the physical structure shown in FIG. 16.

FIG. 16 shows the physical structure used in the high-speed communication buffering control function provided in the network accessing system. FIG. 17 shows a management descriptor table DT included in the physical structure. The management descriptor includes a pointer 68 for pointing to a next upper layer, a pointer 69 for pointing to data storage of each layer, and an area 70 served as storing a data (header) length.

The physical structure comprises n-th layer data 71 having a length of DLn to be written in sequence from an address An, a (n−1)th layer header 72 having a length of DLn-1 to be written at an address An-1, a (n−2)th layer header 73 having a length of DLn-2 to be written at an address An-2, and the like.

The physical structure includes a management descriptor table DT of (n+1)th layer pointer DTn+1 to be written at an address DTn, a data storage pointer An of the n-th layer, and a data length DLn of the n-th layer, a management descriptor table DT of a n-th layer pointer DTn to be written at an address DTn-1, a data storage pointer An-1 of the (n−1)th layer, and a data length DLn-1, a management descriptor table DT of a pointer (n−1)th pointer DTn-1 to be written at an address DTn-2, a data storage pointer AN-2 of the (n−2)th layer, and a data length DLn-2, and the like.

FIGS. 18A–18F show the structure of a data link layer ranked as a first layer to an application layer ranked as a second layer.

FIG. 18A shows the structure of the data link layer 74. The data link layer 74 creates a pointer NP (Next Pointer) for pointing to a next network layer 75, a data storage pointer DP of the data link layer, and a data length DL.

FIG. 18B shows the structure of the network layer 75. The network layer 75 creates a pointer NP for pointing to a next transport layer 76, a data storage pointer DP of the network layer, and a data length DL.

FIG. 18C shows the structure of the transport layer 76. The transport layer 76 creates a pointer NP for pointing to a next session layer 77, a data storage pointer DP of the transport layer 76, and a data length DL.

FIG. 18D shows the structure of the session layer 77. The session layer 77 creates a pointer NP for pointing to a next presentation layer 78, a data storage pointer DP of the session layer 77, and a data length DL.

FIG. 18E shows the structure of the presentation layer 78. The presentation layer 78 creates a pointer NP for pointing to a next application layer 79, a data storage pointer of the presentation layer 78, and a data length DL.

FIG. 18F shows the structure of an application layer 79. The application layer creates last pointers FFFFH in the data storage area, data storage pointers DP1 to DP3 of the application layer 79, and data lengths DL1 to DL3 which are respectively included in all the packets.

Figure 19:
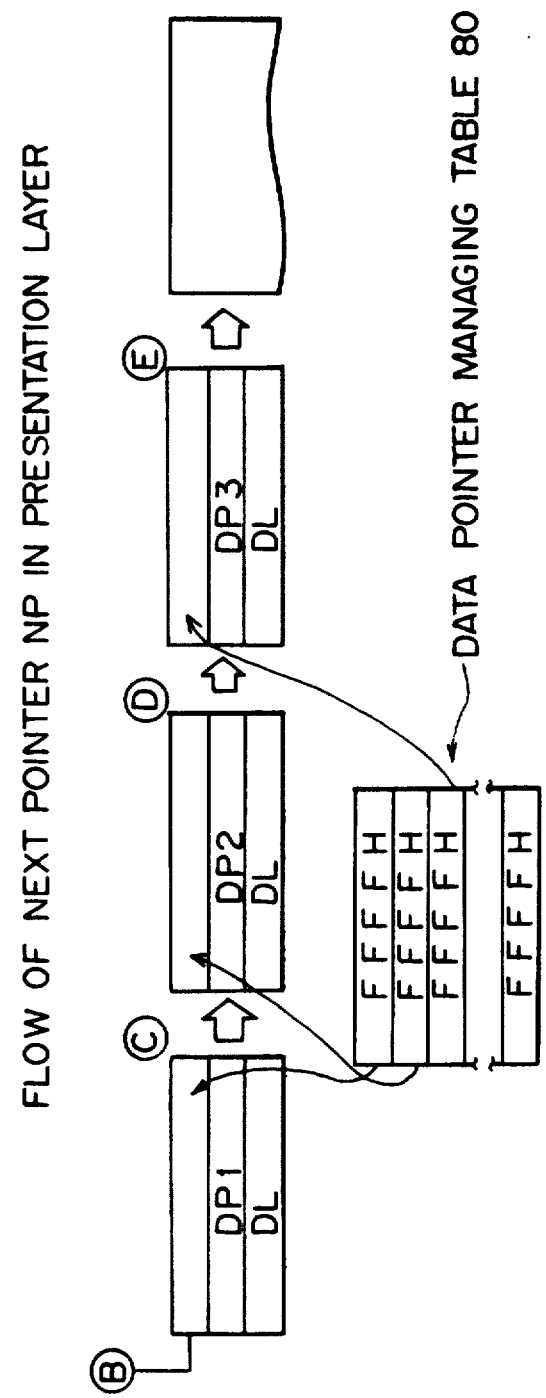
FIG. 19 is an explanatory view showing a presentation-layer pointer for pointing to the application layer.

FIG. 19 shows a pointer contained in the presentation layer shown in FIG. 18E, which pointer points to the application layer 79 shown in FIG. 18F. The data pointer included in each packet is managed in the data pointer management table 80.

According to the present embodiment, therefore, it is only necessary to rewrite the pointer NP of an upper layer at each layer for the purpose of creating an actual packet. The connecting state and the actual state of the data and the header of each layer are independently managed by the management descriptor table.

Figure 20:
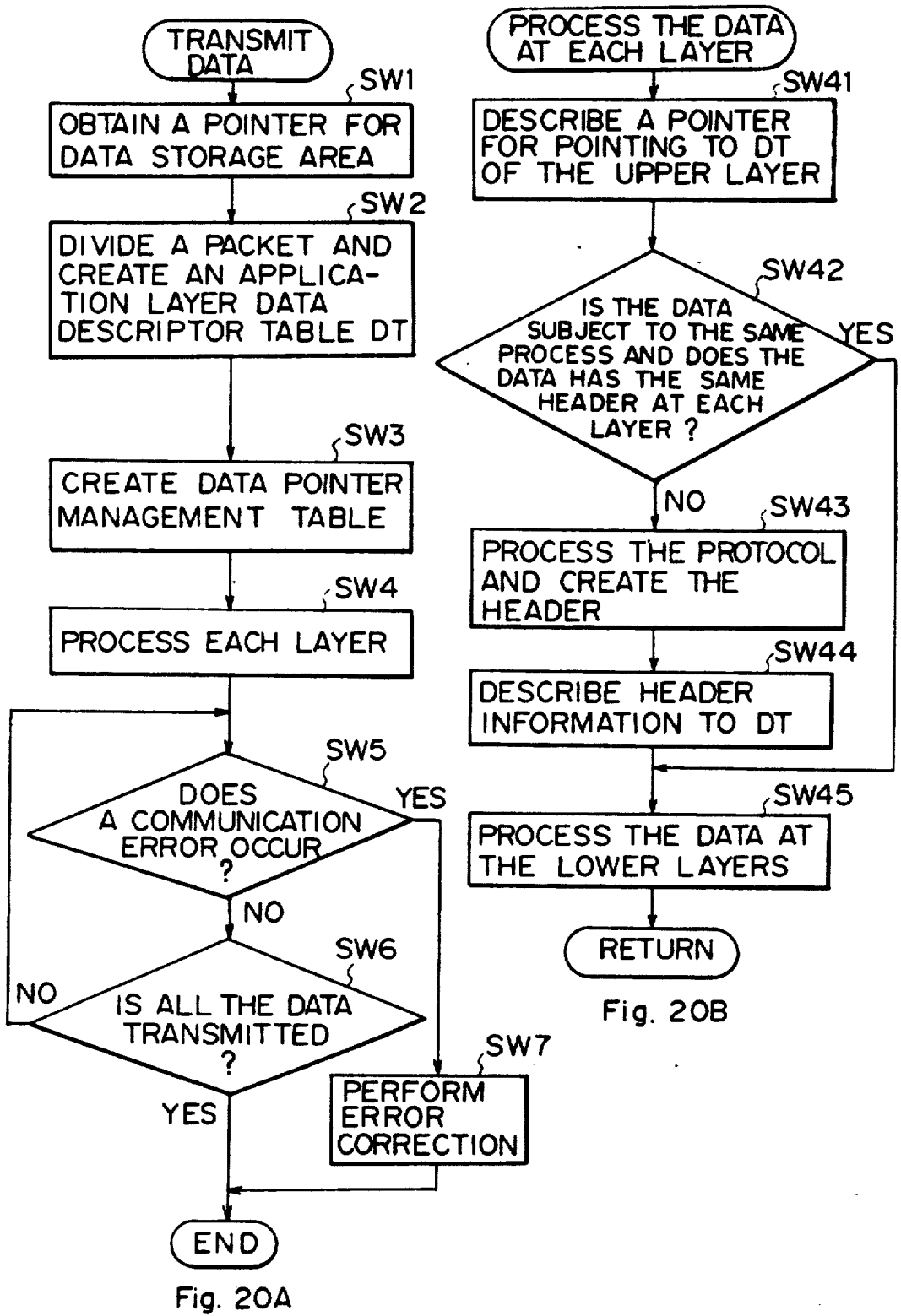
FIG. 20, which consists of FIG. 20A and 20B, is a flowchart showing the transmitting operation of the accessing system according to the fourth embodiment.

FIGS. 20A and 20B shows the process of creating the management descriptor table when the data is transmitted.

As shown in FIG. 20A, a head pointer of the data storage area is obtained from the application (step SW1) and the data storage pointer DP is obtained for each packet for creating the management descriptor table DT (step SW2). The data pointer management table 80 is created on the basis of the data storage pointer DP (step SW3).

In succession, the processing is carried out at each layer (step SW4) depending on each protocol. As shown in FIG. 20B, however, if the same header is added and the same processing is carried out for each layer, without creating the header, the pointer NP of the upper layer of the data storage pointer DP is simply described in the management descriptor table DT before passing the data to the next lower layer (steps SW41, SW42, and SW43).

In case a large volume of divided packet is transmitted, only the data about the application layer is divided by the foregoing process.

If, on the other hand, the headers and the processings are respective in the layers, the protocol for each layer is processed and the header for each layer is created (step SW43) and the header information is described in the management descriptor table DT (step SW44). Then, the data is passed to the next lower layer (step SW45).

When the processing of each layer (step SW4) is terminated, the process returns to the flow shown in FIG. 20A. The transmitting packets are prepared and are transmitted (steps SW5 to SW7). It results in advantageously making it possible to carry out the transmitting process far faster than the process of the data done in each layer known by the inventors and described above.

Figure 21:
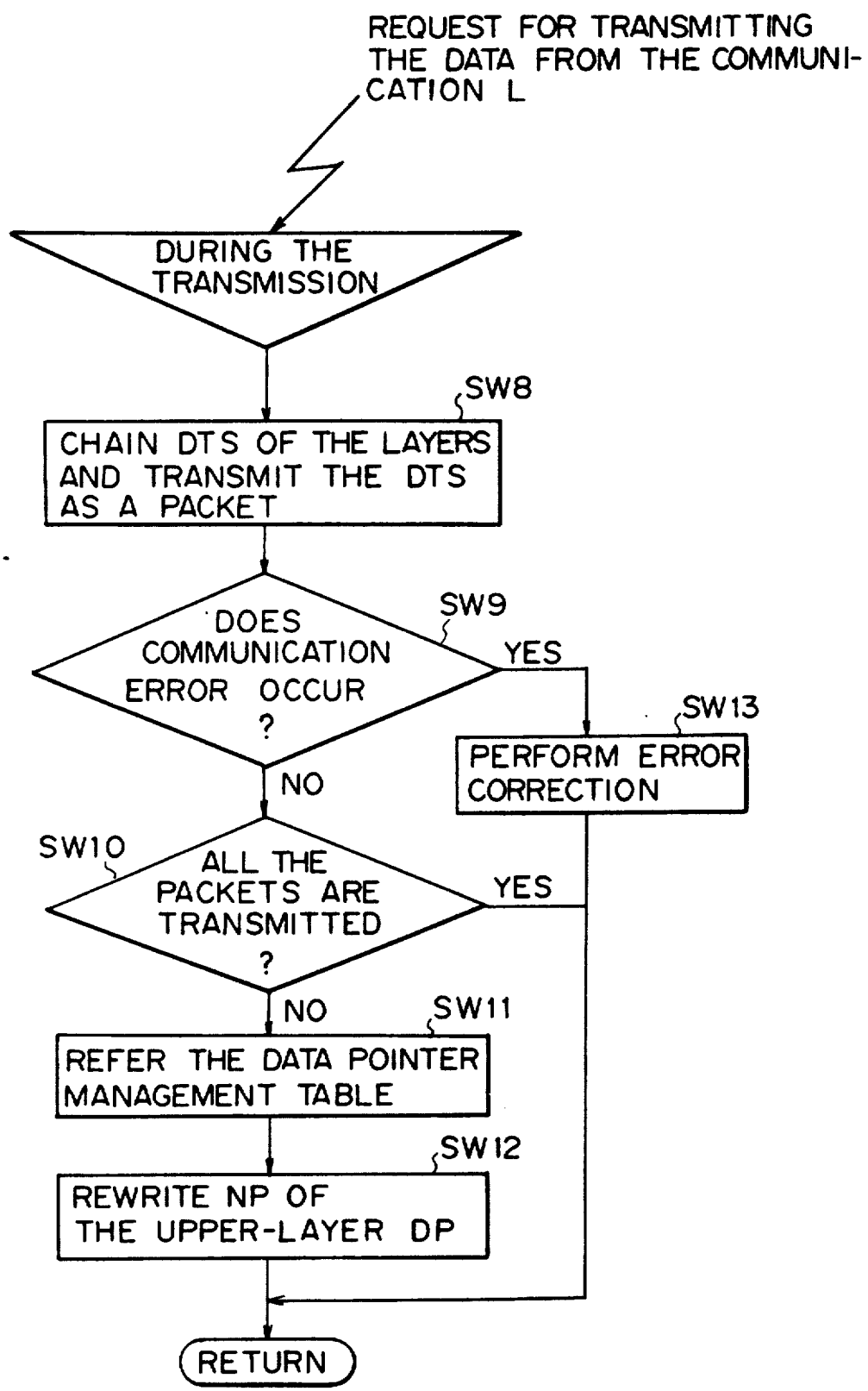
FIG. 21 is a flowchart showing the transmitting operation of the accessing system according to the fourth embodiment.

FIG. 21 shows a procedure of transmitting the transmitting packets to a transmitting medium. When the communication LSI or hardware issues a transmitting request, the management descriptor tables DT of the layers are chained as a packet for transmitting the packet (step SW8). For the next packet, it is only necessary to refer the data pointer management table 80 (step SW11) and rewrite the pointer NP of the upper layer of the management descriptor table DT (step SW12).

Figures 22, 22A, 22B:
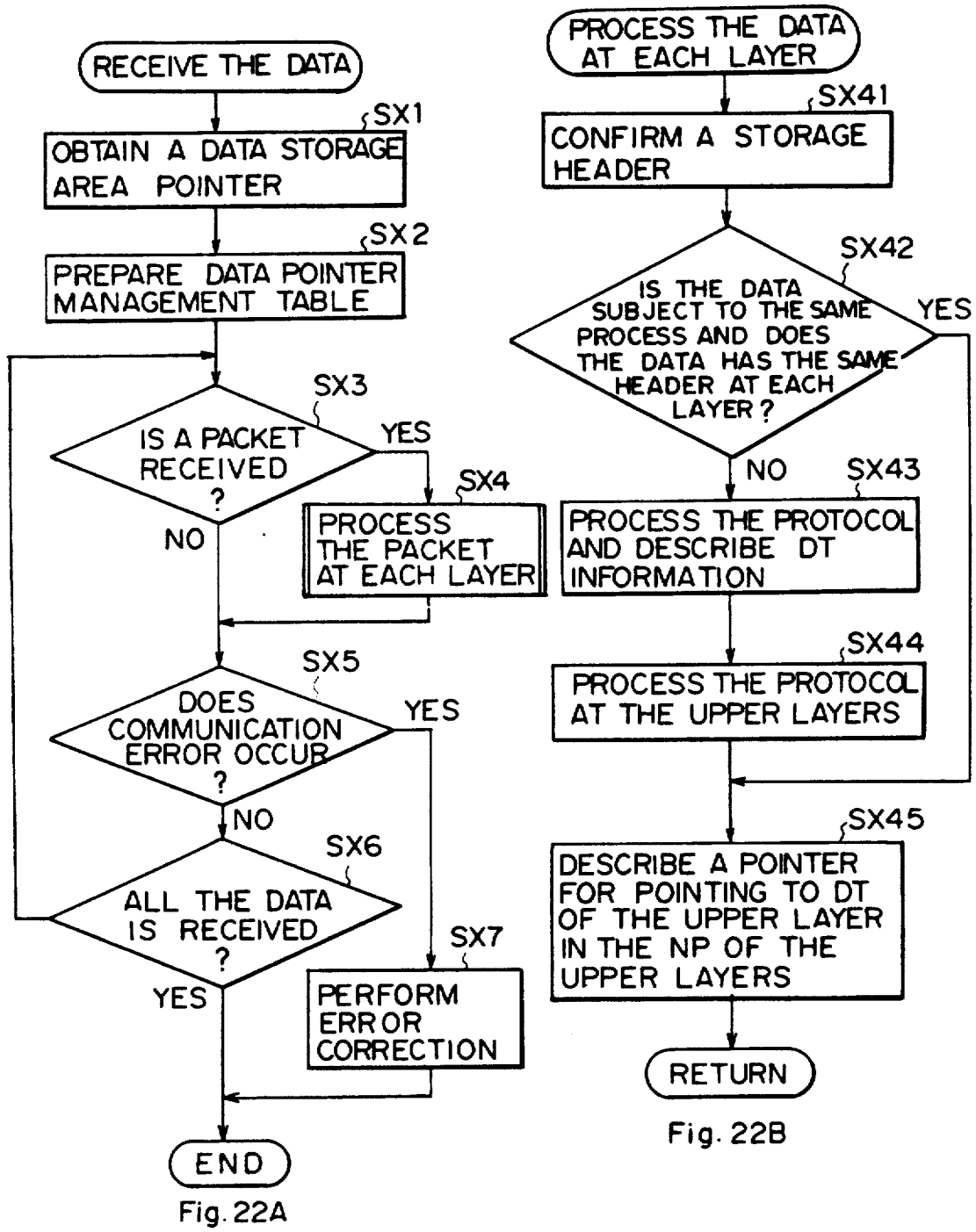
FIG. 22, which consists of FIGS. 22A and 22B, is a flowchart showing the receiving operation of the accessing system according to the fourth embodiment.

FIGS. 22A and 22B shows the process of creating a descriptor table when receiving the data.

As shown in FIG. 22A, like the data transmission, the head pointer of the data storage area is obtained from the application (step SX1) and the data pointer management table 80 is created (step SX2). Then, when receiving a packet (step SX2), the operation goes to the processing of each layer (step SX4, the steps SX41 to SX45 shown in FIG. 22B).

Like the data transmission, if the same header is added and the same processing is carried out for each layer, without creating the header, the pointer NP of the lower layer of the data storage pointer DP is simply described in the management descriptor table DT before passing the data to the next upper layer (steps SX41, SX42, and SX43).

If, on the other hand, the headers and the processings are respective in the layers, the protocol for each layer is processed and the header for each layer is created (step SX43) and the header information is described in the management descriptor table DT (step SX44). Then, the data is passed to the next upper layer (step SX45).

When the processing for all the layers are terminated, the process returns to the flow shown in FIG. 22A. Then, the preparation for receiving packets is terminated so that all the data is allowed to be received (steps SX5, SX6).

Figure 23:
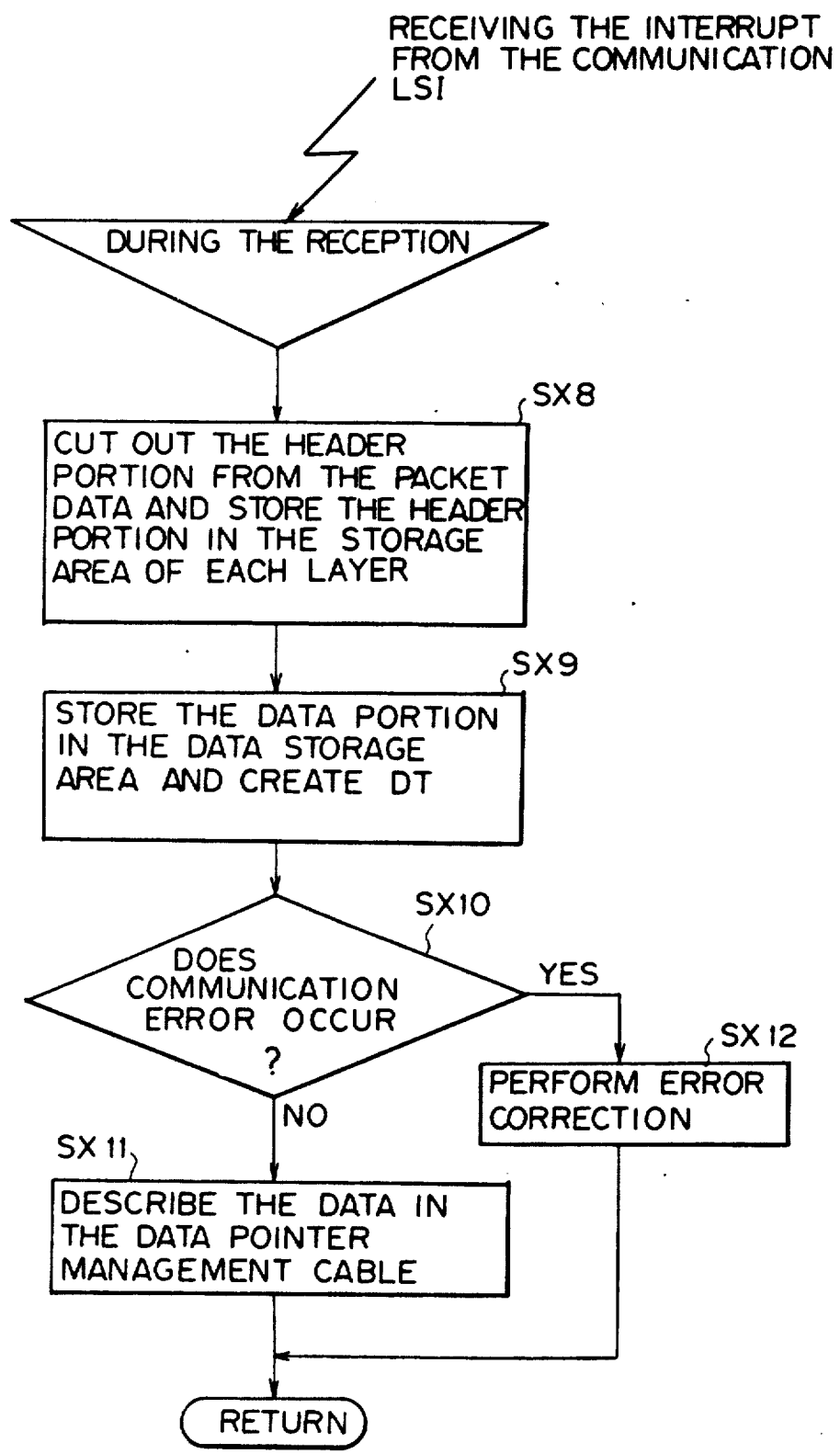
FIG. 23 is a flowchart showing the receiving operation of the accessing system according to the fourth embodiment.

FIG. 23 shows the procedure for receiving the packets from the transmission medium. When the communication LSI or hardware issues a receiving interruption, the header portion is cut out from the packet data and is stored in the header storage area for each layer (step SX8) and the data portion is stored in the data storage area for creating the management descriptor table DT (step SX9). After that, whether the communication error has occurred or not is checked (step SX10). In step SX10, if error is occurred, then it proceeds to step SX12 for performing the error correction. Otherwise, the header portion and the data portion for each layer are described in the data pointer management table 80 (step SX11).

According to the present embodiment, therefore, when data is received, only the data is kept sequentially stored in the data storage area. It is thus unnecessary to handle the interior of the data storage area unless the data sequence has to be changed or the data is retransmitted.

As a result, it is possible to reduce the headers and the processes of each layer necessary to the application. Further, since only the data portion is extracted out of the packet, it is possible to reduce the frequency of unnecessary data copying between the layers, thereby allowing the communication to be realized at high-speed. The present embodiment may apply to an intelligent board system which is designed to process the network protocol with another processor and a non-intelligent board system which is designed so that the communication LSI can support the physical layer and the data link layer and the main CPU can implement the processing of the upper layers.

Figure 24:
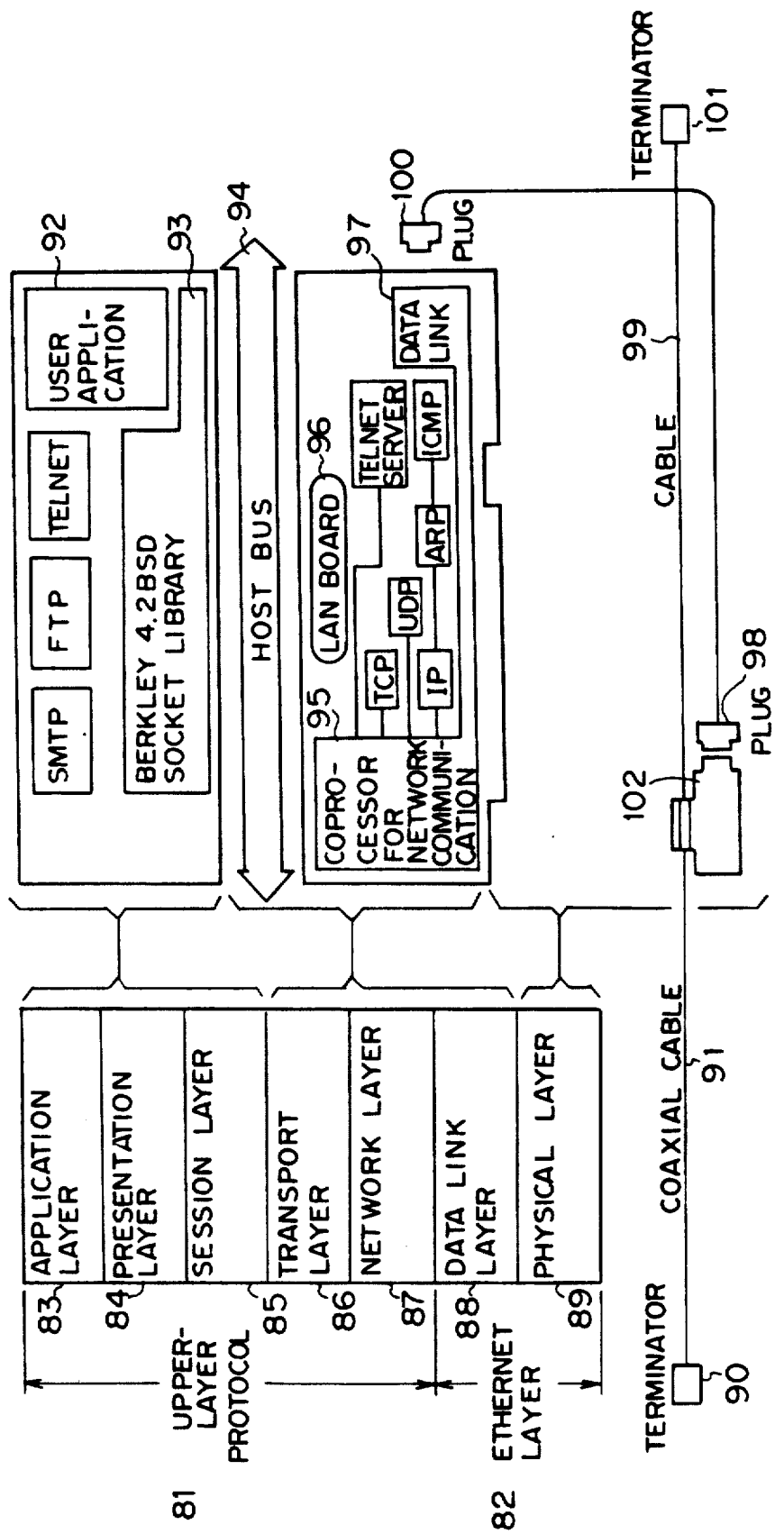
FIG. 24 is an explanatory view showing the hardware to which the high-speed communication buffering control device is applied.

FIG. 24 shows the intelligent board system. As shown, the intelligent board system is divided into two sections, the first section includes a simple main transfer protocol (SMTP), a file transfer protocol (FTP), a telenet, a Berkley 4.2 BSD socket library 93, and a user application 92. The first section of the intelligent board system takes the responsibility of the application layer 83, the presentation layer 84, and the session layer 85 included in the upper protocol layer 81. The second section includes a transmission control protocol (TCP), an internet protocol (IP), a user datagram protocol (UDP), an address resolution protocol (ARP), and an internet control message protocol (ICMP), a host bus 94, a coprocessor for a network communication 95, a LAN board 96, and a data link 97. The second section of the intelligent board system takes the responsibility of the transport layer 86, the network layer 87 in the upper protocol layer 81, and the data link layer 88 in the ethernet layer 82 which includes a physical layer 89.

In addition, the system includes a terminator 90, a coaxial cable 91, a transceiver 102, a plug 98, a plug 100, a cable 99 and a terminator 101.

Figure 25:
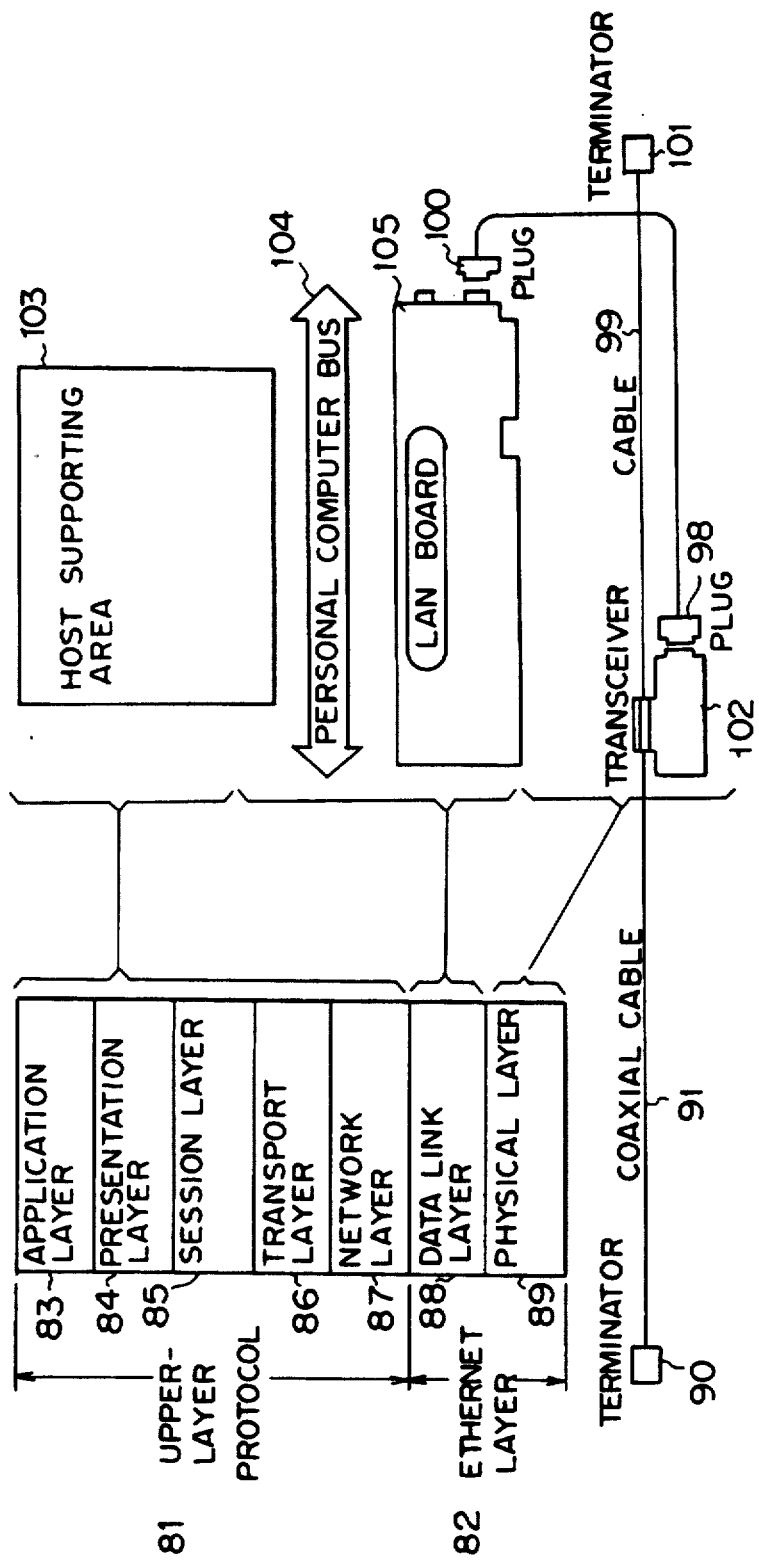
FIG. 25 is an explanatory view showing the hardware to which the high-speed communication buffering control device is applied.

FIG. 25 shows the non-intelligent board system with the same elements in FIG. 24 indicated by the same reference numbers. As shown, the non-intelligent board system is divided into two sections, that is, a host support area 103 and a LAN board 105 with a personal computer bus 104. The host support area 103 takes the responsibility of the layers from the application layer 83 to the network layer 87 in the upper protocol layer 81 and the LAN board 105 takes the responsibility of the data link layer 88, and the physical layer 89 in the ethernet layer 82.

In turn, the description will be directed to the fourth embodiment of the present invention. The fourth embodiment concerns with the local area network providing a high-speed communication bus window control device. For deeper and easier understanding of this embodiment, please refer to the description about FIG. 14 respect to the head of the description about the third embodiment.

Figure 26:
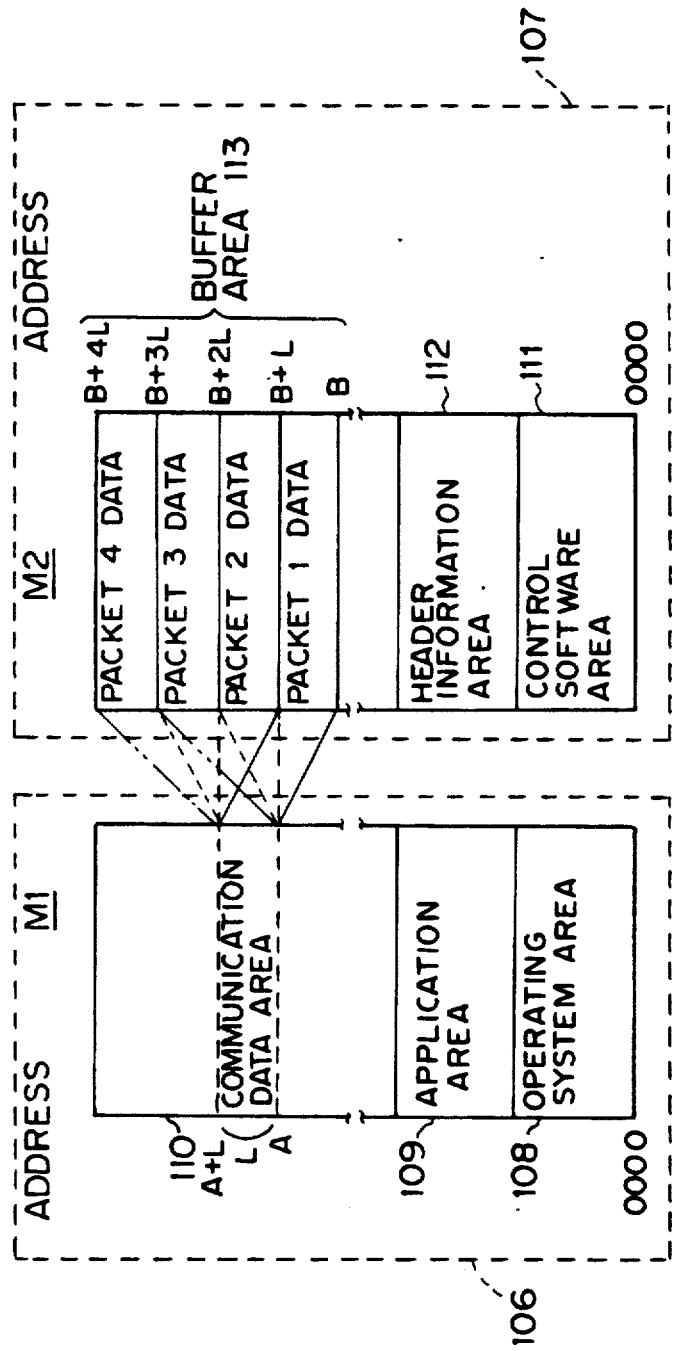
FIG. 26 is an explanatory view showing arrangement of a memory map of the main CPU board and a memory map of the communication board in the network system-connected device accessing system providing a high-speed communication bus window control device according to the fourth embodiment of the present invention.

FIG. 26 is an explanatory view showing the concept of a high-speed communication bus window control device. 106 denotes a main CPU board having a memory map M1 served as a first memory map. 107 denotes a communication board having a memory map M2 served as a second memory map.

The memory map M1 is configured to have an operating system are 108, an application area 109 composed on the OSI reference mode, and a communication data area 110. In the operating system area 108 and the application area 109, the data is sequentially written from an address 0000 of a first address group. In the communication data area 110, the data is written from an address A to an address A+L of the first address group.

The memory map M2 is configured to have a control software area 111, a header information area 112, and a buffer area 113 of each packet data. In the control software area 111 and the header information area 112, the data is sequentially written from an address 0000 of a second address group. In the buffer area 113, the data is written from an address B to addresses B+L, B+2L, B+3L and then to B+4L.

Figure 27:
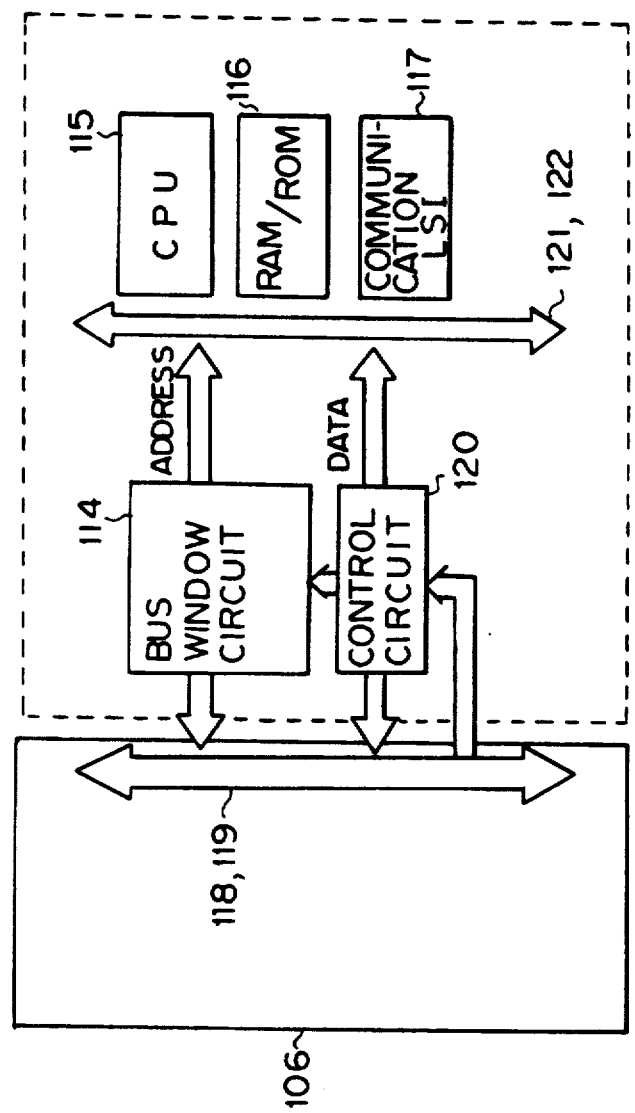
FIG. 27 is a diagram showing a communication board included in the high-speed communication bus window control device employed in the fourth embodiment.

Herein, the communication data area 110 of the memory map M1 included in the main CPU board 106 is allowed to transparently indicate the buffer area 113 served as a specific area of the memory map M2 of the communication board 107 through a bus window circuit 114 (see FIG. 27).

The bus window circuit 114 enables to map the buffer area 113 of the memory map M2 into the communication data area 110 served as a specific area of the memory map M1. Then, the main CPU board 106 directly reads or write the data from or in the buffer are 113 so as to pass or receive an address pointer for indicating the head of the data. Hence, the main CPU (not shown) of the main CPU board 106 enables to refer the packet data contained in the memory map M2 simply by setting a packet data pointer to the bus window circuit 114.

Next, FIG. 27 shows the arrangement of the communication board 107 shown in FIG. 26.

The communication board 107 is configured to have a CPU 115 for controlling the communication board 107, a RAM and ROM 116 having a ROM for storing the programs of the CPU 115 and a RAM containing the areas 111, 112, 113, and a communication LSI 117 for carrying out the communication through the network.

The communication board 107 further includes the bus window circuit 114 for controlling an address between the CPU 115 and an address bus/control bus 118 of the host bus of the main CPU board 107, a control circuit 120 for controlling the data between the CPU 115 and the data bus 119 of the host bus of the main CPU board 107, and address bus/control bus 121, and a data bus 122.

Figure 28:
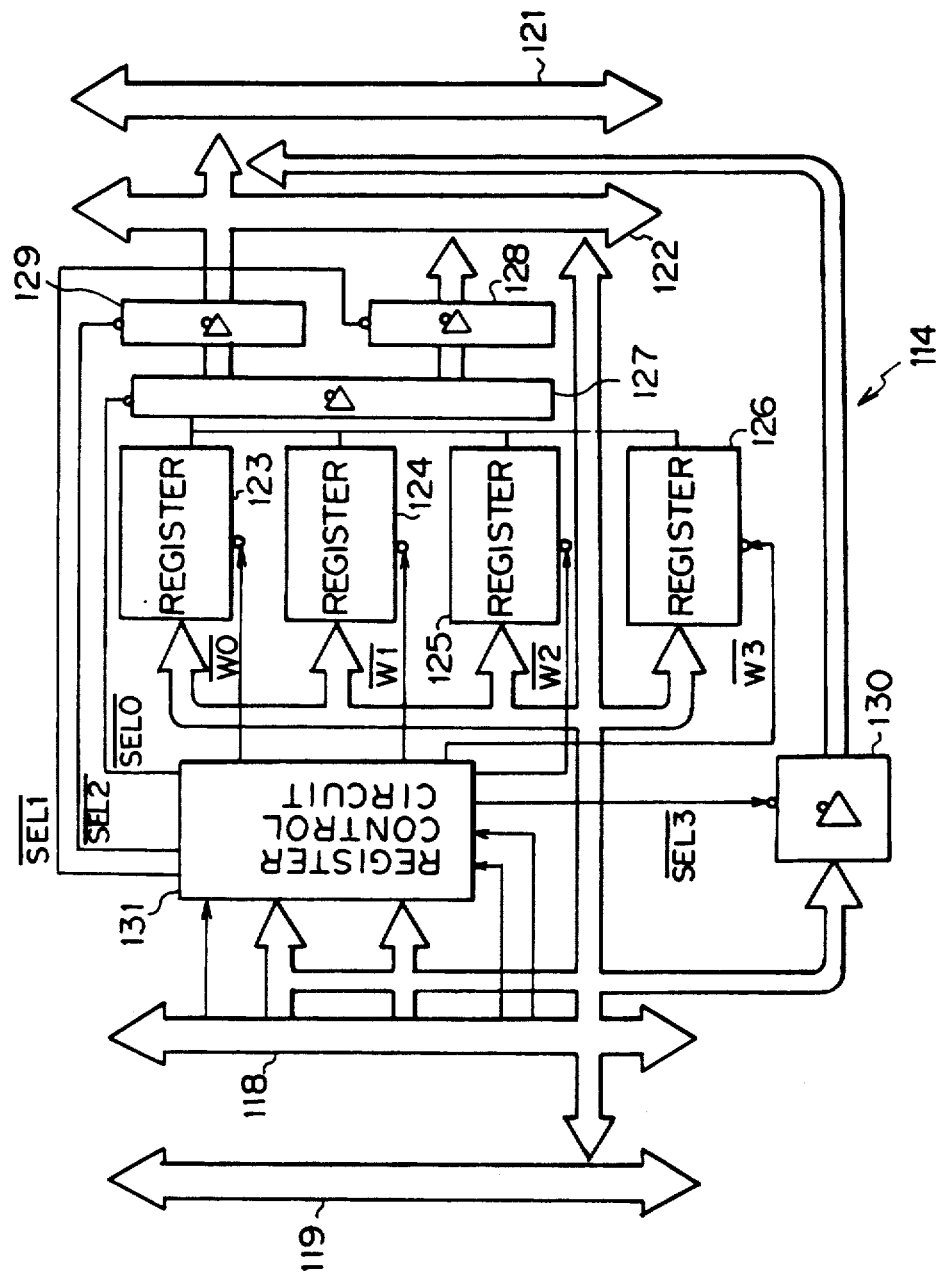
FIG. 28 is a block diagram showing a bus window circuit employed in the fourth embodiment.

Next, FIG. 28 shows arrangement of the bus window circuit 114 shown in FIG. 27.

The bus window circuit 114 provides registers 123 to 126 for storing addresses in response to the control signals $\overline{W0}$ to $\overline{W3}$, and a register control circuit 131 for controlling the registers 123 to 126 and buffers 127 to 130. Hereinafter, in case the control signal is marked by a node with an over-bar, the control signal is negative.

The buffers 127 to 130 are designed to output the addresses to the data bus 122 in response to the control signals SEL0 to SEL3 sent form the register control circuits 131 corresponding to these buffers.

The arrangement shown in FIG. 28 provides four memory windows each consisting of 128 Kbytes in the memory area of 512 Kbytes (corresponding to the address "80000H" to "FFFFFH"). Any buffer address in the communication board 107 is allowed to be indicated through the memory window.

The main CPU of the main CPU board 106 serves to write the buffer head address in the registers 123 to 126 assigned to the input/output (I/O) map. Then, when the area from 512 Kbytes to 1 Mbytes is accessed, the main CPU of the main CPU board 106 serves to output the data to the address bus/control bus 121 of the communication 107 with the latch data of the registers 123 to 126 being served as addresses. The register control circuit 131 provides a bus window inhibit register to be operated if the high speed communication bus window control device is not used.

Then, the description will be directed to the condition that the control signals used in the bus window circuit 114 made active.

The control signals $\overline{W0}$ to $\overline{W3}$ are made active when the address bus/control bus 118 of the host bus gives I/O write access to the addresses corresponding to the registers 123 to 126.

The control signal $\overline{SEL0}$ is made active when the host bus gives I/O read access to the addresses corresponding to the registers 123 to 126. The data is selected from the register corresponding to the accessed address and is output to the data bus 122 in concert with the control signal $\overline{SEL1}$ (It results in allowing the address written in the register to be read). When accessing the memory area of 512 Kbytes or more, the data located at the addresses in the registers 123 to 126 are output to the address bus/control bus 121 of the communication board 107 in concert with the control signal SEL2.

The control signal $\overline{SEL1}$ is made active when the host bus gives I/O read access to any one of the addresses of the registers 123 to 126.

The control signal $\overline{SEL2}$ is made active when the host bus gives access to the memory area of 512 Kbytes to 1 Mbytes and the register located inside of the register control circuit 131 enters into a bus window inhibitive state.

The control signal $\overline{SEL3}$ is made active when the host bus gives access to the memory area of 512 Kbytes to 1 Mbytes if the register located inside of the register control circuit 131 enters into a bus window inhibitive state.

The high-speed communication bus window according to the present embodiment operates to pass or receive the data between the layers in the similar manner to the high-speed communication buffering control device according to the third embodiment. Hence, please refer the description about FIGS. 15 to 26.

In addition, like the third embodiment, the present embodiment may apply to the intelligent board system and the non-intelligent board system. These systems have been discussed with respect to the third embodiment. Hence, please refer the description about FIGS. 24 and 25.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system having a plurality of devices connected at nodes in a network, said system, in response to an access request from a node, being capable of accessing any one of said plurality of devices by using a system call, said system comprising:

means responsive to said access request for detecting any one of said plurality of devices which is requested to be accessed and for detecting a node in said network with which said device is connected;

means connected to said detecting means for converting said system call into a protocol when said detecting means detects that said node connected with said requested device is different from said node in said network from which the access request is issued;

means connected to said converting means for transmitting said protocol from said node from which said access is issued to said node connected with said requested device in said network; and means connected to said transmitting means for reconverting said protocol which is transmitted from said node from which said access is issued to said node connected with said requested device into said system call so that said system call is executed at said node connected with said requested device and said device is accessed by said node from which said access is issued in accordance with said reconverted system call.

2. A system according to claim 1, wherein said converting means executes said system call when said detecting means detects that said requested device to be accessed is connected with said node from which said access is issued.

3. A system according to claim 1, wherein said detecting means includes an application means for issuing said system call for accessing said requested device, and a router means for detecting whether or not said requested device to be accessed is located in said node issuing the access request.

4. A system according to claim 1, wherein said converting means includes a device managing portion for executing said system call when said device to be accessed is located in said node from which said system call is issued, and a network device managing portion located at said node from which said system call is issued for converting said system call into said protocol when said device to be accessed is not located in said node from which said system call is issued.

5. A system according to claim 1, wherein said transmitting means includes a communication managing portion located at said node from which said system call is issued for transmitting said converted protocol to a communication managing portion located at said node connected with said device to be accessed.

6. A system according to claim 1, wherein said reconverting means includes a network device managing portion located at said node connected with said device to be accessed for reconverting said protocol into said system call originally issued, and a device managing portion located at said node connected with said device to be accessed for executing said reconverted system call.

7. A system according to claim 1, wherein said device to be accessed is a peripheral device connected with any one of said nodes in said network, and said peripheral device is any one of a printer, a display device, a hard disk, an application program, or a data base.

8. A system having a plurality of devices and consoles connected at nodes in a network, said system in response to an access request from a node being capable of accessing a console connected with any one of said nodes in said network, said system comprising:
　means for detecting a console to be accessed in any one of said nodes;
　means responsive to said detecting means for executing a system call when said console to be accessed is connected to a node from which an access request is issued and for converting said system call into a protocol when said console to be accessed is connected with a node from which said access request is not issued;
　means for transmitting said protocol from said node from which said access request is issued to said node connected with said requested console through an interface; and
　means for reconverting said transmitted protocol into said system call and for executing said system call so that said system call is executed at said node connected with said requested console and said requested console is accessed by said node form which said access request is issued in accordance with said reconverted system call.

9. A system for accessing a plurality of devices connected in a network, said system having a plurality of hierarchical layers and said layers including headers, at a node from which an access request is issued and adapted to transmit data through said network, said system comprising:
　a first means for storing said data so that said data at each of said plurality of hierarchical layers is transmitted from said node from which said access request is issued to a different receiving node;
　means connected to said first means for dividing said data into a plurality of data packets when said data is subjected to the same process and has the same header in each of said plurality of hierarchical layers, each of said plurality of packets further including a pointer; and
　a second means connected to said dividing means for storing said data so that said stored data is used for rewriting said pointer of each of said plurality of packets indicated by said same header before transmitting said plurality of packets in said network.

10. A system according to claim 9, wherein said first storing means is a management descriptor table having a pointer for pointing to a next upper hierarchical layer, a data storage pointer of each hierarchical layer, and a storage area for storing a header length.

11. A system according to claim 9, wherein said second storing means is a data pointer management table for storing a data pointer of each of said plurality of packets.

12. A system according to claim 9, wherein said plurality of hierarchical layers are composed of an application layer, a presentation layer, a session layer, a transport layer, a data link layer, and a physical layer on any one of said nodes.

13. A system according to claim 12, wherein said application layer is capable of dividing data thereon into said plurality of packets when a large volume of said packets is transmitted.

14. A system according to claim 12, wherein said system includes an intelligent board system for dividing a responsibility for managing said plurality of hierarchical layers into two kinds of responsibilities, one of said responsibilities being for managing said application layer, said presentation layer and said session layer, the other one of said responsibilities being for managing remaining layers in said plurality of hierarchical layers.

15. A system according to claim 12, wherein said system includes a non-intelligent board system for dividing a responsibility for managing said plurality of hierarchical layers into two kinds of responsibilities, one of said responsibilities being for managing said application layer to said network layer, the other one of said responsibilities being for managing said data link layer.

16. A system having a plurality of hierarchical layers at a node from which an access request is issued, said system being capable of accessing a plurality of devices connected in a network and for transmitting data in said network, said system comprising:
　a first memory map having a plurality of areas for sequentially storing each particular address to be written for a first address group;
　a second memory connected to said first memory map and having a plurality of areas for sequentially storing each particular address to be written for a second address group; and
　a bus window circuit connected to both said first memory map and said second memory map for mapping a particular area of said second memory map into a particular area of said first memory map for passing an address pointer indicating a header portion to be transmitted.

17. A system according to claim 16, wherein said first memory map is composed of an operating system area, an application area formed on an Open System Interconnection reference model, and a communication data area.

18. A system according to claim 16, wherein said secondary memory map is composed of a control software area, a header information area, and a buffer area for each packet of data.

19. A system according to claim 16, wherein said bus window circuit maps said buffer area of said second memory map into said communication data area of said first memory map.

* * * * *